(12) United States Patent
Sugio et al.

(10) Patent No.: US 8,156,722 B2
(45) Date of Patent: Apr. 17, 2012

(54) MOWER HAVING A GRASS CLIPPINGS GUIDE AND SHIELD MEMBER

(75) Inventors: Akihito Sugio, Kakogawa (JP); Kazuo Sameshiima, Kaizuka (JP); Akira Minoura, Osaka (JP); Masatake Murakawa, Osaka (JP); Masatoshi Yamaguchi, Izumi (JP); Kazuo Koike, Kobe (JP); Masato Asahara, Kobe (JP); Yoshikazu Togoshi, Osaka (JP); Osami Fujiwara, Kishiwada (JP); Koji Fujiwara, Sakai (JP)

(73) Assignee: Kubota Corporation, Osaka (JP)

( * ) Notice: Subject to any disclaimer, the term of this patent is extended or adjusted under 35 U.S.C. 154(b) by 9 days.

(21) Appl. No.: 12/243,508

(22) Filed: Oct. 1, 2008

(65) Prior Publication Data
US 2009/0178382 A1   Jul. 16, 2009

(30) Foreign Application Priority Data

| | | |
|---|---|---|
| Jan. 11, 2008 | (JP) | 2008-004621 |
| Jan. 11, 2008 | (JP) | 2008-004622 |
| Jan. 11, 2008 | (JP) | 2008-004623 |
| Feb. 25, 2008 | (JP) | 2008-042993 |

(51) Int. Cl.
*A01D 67/00* (2006.01)

(52) U.S. Cl. ................ 56/320.1

(58) Field of Classification Search ........... 56/320.1
See application file for complete search history.

(56) References Cited

U.S. PATENT DOCUMENTS

| | | | | | |
|---|---|---|---|---|---|
| 4,890,446 | A | * | 1/1990 | Israel | 56/17.5 |
| 5,457,947 | A | * | 10/1995 | Samejima et al. | 56/16.7 |
| 5,465,564 | A | * | 11/1995 | Koehn et al. | 56/320.2 |
| 5,765,346 | A | * | 6/1998 | Benter et al. | 56/2 |
| 6,470,663 | B2 | * | 10/2002 | Langworthy et al. | 56/320.2 |
| 6,735,932 | B2 | * | 5/2004 | Osborne | 56/320.1 |
| 6,846,246 | B2 | * | 1/2005 | Asplund et al. | 473/327 |
| 6,848,246 | B2 | | 2/2005 | Samejima et al. | |
| 6,862,875 | B2 | * | 3/2005 | Iida et al. | 56/320.2 |
| 6,877,302 | B2 | * | 4/2005 | Samejima et al. | 56/320.2 |
| 7,171,799 | B2 | * | 2/2007 | Takeishi et al. | 56/320.1 |
| 7,299,613 | B2 | * | 11/2007 | Samejima et al. | 56/320.1 |
| 7,360,352 | B2 | * | 4/2008 | Samejima et al. | 56/320.2 |
| 7,665,286 | B2 | * | 2/2010 | Butler et al. | 56/320.1 |

FOREIGN PATENT DOCUMENTS

| | | |
|---|---|---|
| JP | 62167521 U | 10/1987 |
| JP | 534823 U | 5/1993 |
| JP | 10248351 A | 9/1998 |
| JP | 200441060 A | 2/2004 |
| JP | 2005-253387 A | 9/2005 |
| JP | 2006109763 A | 4/2006 |

* cited by examiner

*Primary Examiner* — Thomas Will
*Assistant Examiner* — Mai Nguyen
(74) *Attorney, Agent, or Firm* — The Webb Law Firm

(57) ABSTRACT

Disclosed is a mower with a mower deck, a plurality of cutting chambers mutually communicated and arranged in a lateral direction within the mower deck, and a blade mounted in each cutting chamber to be rotatable about a vertical axis. A grass clippings guide in form of a vertical wall is disposed in an upper area within the cutting chamber, to guide the grass clippings flowing within the cutting chamber toward a center of rotation of the blade. A shield member is disposed for preventing entry of grass clippings between the grass clippings guide and a peripheral wall of the cutting chamber.

5 Claims, 31 Drawing Sheets

MOWER HAVING A GRASS CLIPPINGS GUIDE AND SHIELD MEMBER

BACKGROUND OF THE INVENTION

1. Field of the Invention

The present invention relates to a mower mainly used for mowing a lawn.

2. Description of the Related Art

In a known mower for mowing a lawn (e.g., JP 2005-253387 A), a plurality of blades rotated about a vertical axis is arranged side by side within a flat mower deck having a flat ceiling. A forward baffle plate shaped along rotational loci of opposite ends of the blades is provided to an inside forward part of the mower deck, and grass is cut in a mulching mode in which grass is repeatedly carried around, finely cut and released behind the passage of the mower.

In mowing work carried out in mulching mode, fine-cutting chambers each housing a blade are disposed independent from each other, whereby grass clippings is carried around and finely cut in an independent fashion in each of the cutting chambers. A means for further enhancing fine-cutting performance is also implemented by providing a vertical wall-shaped grass clippings guide that faces from a peripheral wall of each of the cutting chambers toward the center of blade rotation, guiding the grass clippings that revolve and flow inside the cutting chambers to the rotational center of the blades, and causing the grass clippings to slow down and drop.

However, in the conventional structure, since a grass clippings guide composed of a plate material is mounted in the form of a vertical wall on the ceiling of the mower deck, a space wedge-shaped in plan view is present between the grass clippings guide and the cutting chamber peripheral wall formed by the forward baffle plate, and some grass clippings can enter into this space and adhere together with mud to form a large clump that is deposited on the surface at the end of mowing. A clump solidified in this manner cannot be removed by washing alone and must be broken apart using a bar or the like, and mower cleanup after the mowing work is laborious.

In view of the foregoing aspects of the prior art, an object of the present invention is to facilitate mower cleaning after the mowing work.

SUMMARY OF THE INVENTION

The above object is fulfilled according to one aspect of the present invention, namely:

A mower comprising:
  a mower deck;
  a plurality of cutting chambers mutually communicated and arranged in a lateral direction within the mower deck; and
  a blade mounted in each cutting chamber to be rotatable about a vertical axis;
  wherein
  a grass clippings guide in form of a vertical wall is disposed in an upper area within the cutting chamber, to guide the grass clippings flowing within the cutting chamber toward a center of rotation of the blade; and
  a shield member is disposed for preventing entry of grass clippings between the grass clippings guide and a peripheral wall of the cutting chamber.

In accordance with the above aspect, a space is not present into which grass clippings and soil enter and become deposited between the grass clippings guide and the cutting chamber peripheral wall, and grass clippings and soil deposited on the inner surface of the mower deck can be easily removed by merely washing after mowing work.

Therefore, labor for breaking apart the clumped deposits using a bar or the like is not required, and mower cleaning after mowing work can be carried out in a simple manner.

In one preferred embodiment, the shield member is mounted on and supported by the grass clippings guide.

In accordance with the above aspect, the grass clippings guide can be used as a mounting bracket for the shield member. Therefore, a dedicated mounting bracket is not required and the number of components can be reduced.

Preferably, the shield member is mounted on and supported by the grass clippings guide so that a height of the shield member is adjustable.

In accordance with the above aspect, the height of the lower surface of the shield member can be modified according to the amount of grass clippings, amount of moisture, amount soil brought up from the ground and other work conditions, and the grass clippings that flow along the lower surface of the shield member can be made to flow smoothly, carried around, and finely cut.

Other aspects and advantages will be apparent by reading the description hereinafter with reference to the accompanying drawings.

Unless explicitly described otherwise, the direction in which the vehicle body travels straight ahead (travels forward) will be referred to as a fore/aft direction, the horizontal direction orthogonal to the fore/aft direction will be referred to as a right/left direction (or lateral direction), and the direction perpendicular to the fore/aft direction and the right/left direction will be referred to as a vertical direction.

BRIEF DESCRIPTION OF THE DRAWINGS

FIGS. 1 to 8 show a first embodiment of the present invention, in which:
  FIG. 1 is a side view of an entire riding-type lawn mower;
  FIG. 2 is a plan view of the entire riding-type lawn mower;
  FIG. 3 is a plan view of a mower;
  FIG. 4 is a transverse sectional plan view of the mower;
  FIG. 5 is a vertical sectional side view of the mower;
  FIG. 6 is a side view of a grass clippings guide part;
  FIG. 7 is an exploded perspective view of the grass clippings guide part as viewed from oblique-below; and
  FIG. 8 is a side view of the grass clippings guide part configured in a different specification.

FIGS. 9 to 15 show a second embodiment of the present invention, in which:
  FIG. 9 is a plan view of a mower;
  FIG. 10 is a vertical sectional side view of the mower;
  FIG. 11 is a transverse sectional plan view of the mower;
  FIG. 12 is a transverse plan view of a mower in which the specification of the discharge of grass clippings has been modified;
  FIG. 13 is a perspective view showing a modified structure of a forward baffle plate;
  FIG. 14 is a transverse sectional plan view showing a mower of another embodiment; and
  FIG. 15 is a transverse sectional plan view showing a mower of still another embodiment.

FIGS. 16 to 22 show a third embodiment of the present invention, in which:
  FIG. 16 is a plan view of a mower having a side discharge specification;
  FIG. 17 is a transverse sectional plan view of the mower;
  FIG. 18 is a vertical sectional side view of the mower;

FIG. 19 is a vertical sectional side view in the vicinity of an adjustment plate;

FIG. 20 is a front surface view in the vicinity of the adjustment plate;

FIG. 21 is a plan view of a mower configured with a mulching specification; and

FIG. 22 is a transverse sectional plan view of the mower configured with the mulching specification.

FIGS. 23 to 27 show a fourth embodiment of the present invention, in which:

FIG. 23 is a plan view of a mower;

FIG. 24 is a transverse sectional plan view of the mower configured in a side discharge mode;

FIG. 25 is a transverse sectional plan view of the mower configured in a mulching mode;

FIG. 26 is a vertical sectional side view of a mower configured in the mulching mode; and FIG. 27 is a vertical sectional side view of a forward baffle plate of a mower.

DESCRIPTION OF THE PREFERRED EMBODIMENTS

Preferred embodiments of the present invention will described hereinafter with reference to the drawings. It is to be understood that a combined structure of a plurality of embodiments should belong to the present invention.
[First Embodiment]

Figure 1:
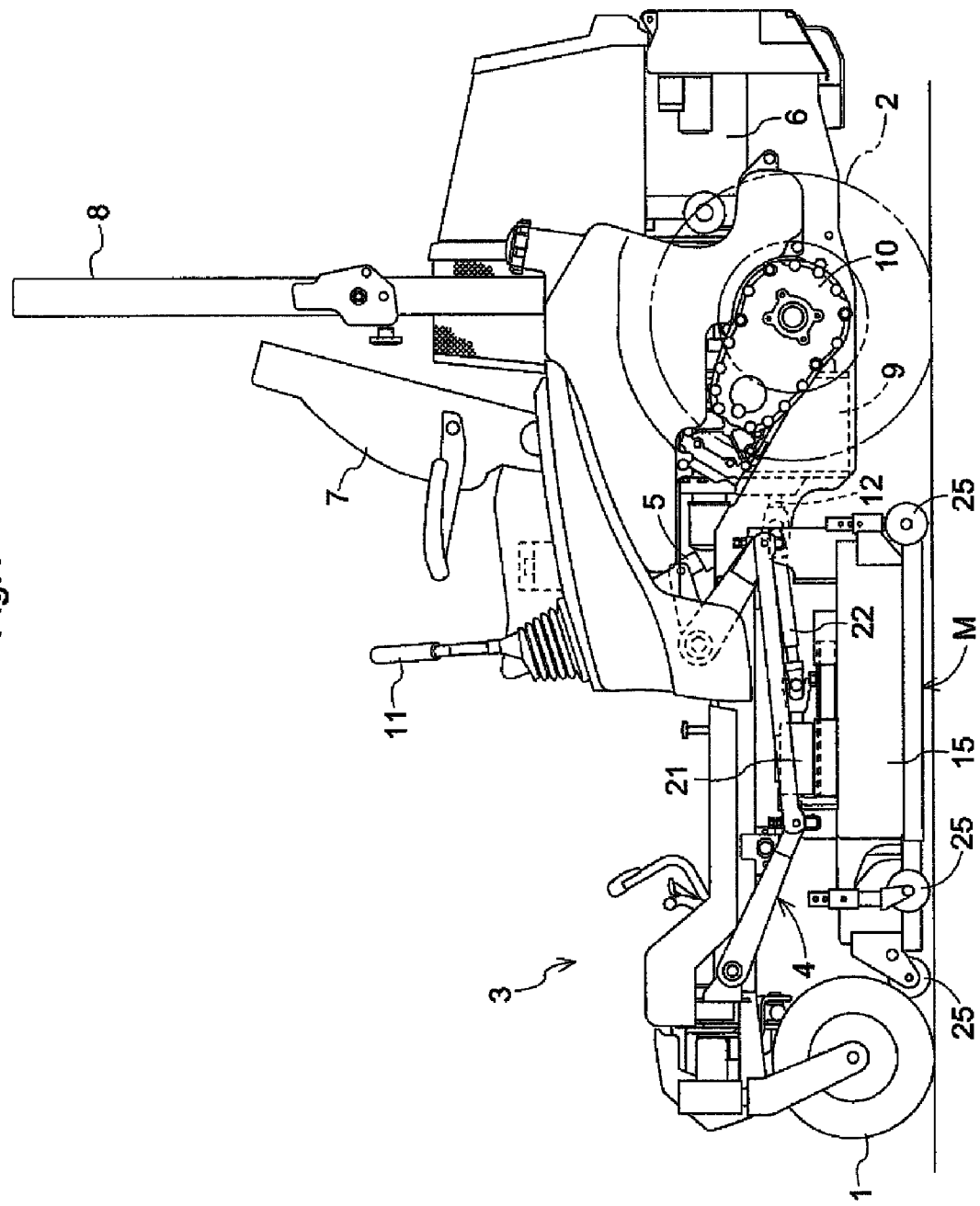
Figure 2:
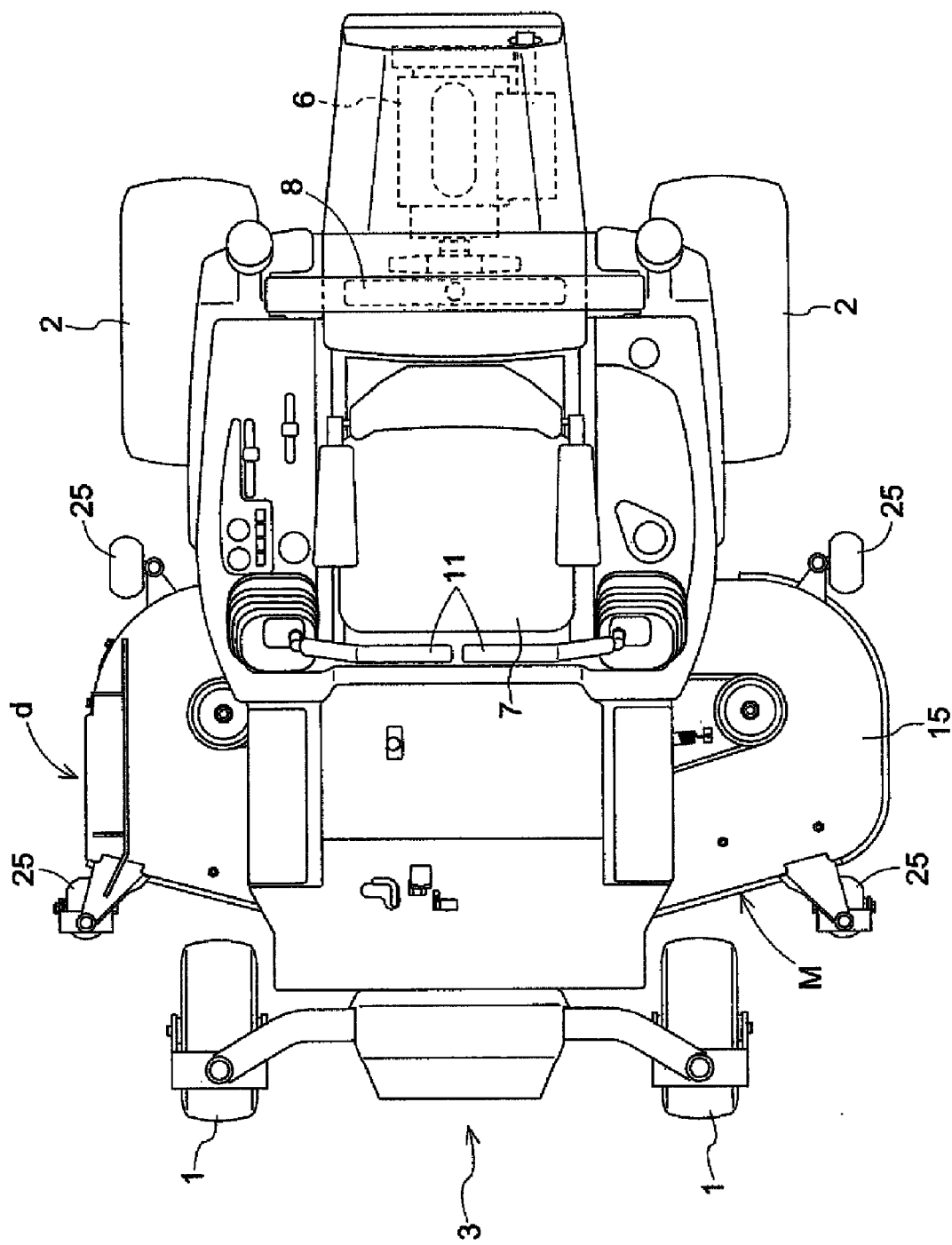

FIG. 1 shows a side view of an entire riding-type lawn mower on which a mower M according to the present invention is mounted. FIG. 2 shows a plan view of the entire riding-type lawn mower. The riding-type lawn mower has a pair of right/left front wheels 1 in form of caster wheels and a pair of right/left driving rear wheels 2 provided to a vehicle body 3. The riding-type lawn mower has the mower M suspended by a parallelogram link mechanism 4 in a lower area between the front wheels 1 and rear wheels 2 of the vehicle body 3. The mower M is operable to raise/lower substantially parallel to/from the vehicle body 3 through the link mechanism 4 by a hydraulic cylinder 5. An engine 6 is mounted at a rear position of the vehicle body 3, and a driver's seat 7 and a rollover protective frame (ROPS) 8 having a portal shape are disposed forwardly of the engine 6.

Although not described in detail, the power outputted from the engine 6 is inputted into a counter case 9, in which the power is divided into a power for a travel system and a power for a work system (an implement driving system). The power for the travel system is inputted into a pair of right/left hydrostatic transmissions (HSTs, not shown) disposed on the right/left sides of the counter case 9, and the power speed-changed by and outputted from the HSTs is transmitted to the right/left rear wheels 2 through right/left reduction cases 10, respectively. The HSTs are operable to speed-change the right/left rear wheels 2 independently fore and aft steplessly by individually pivoting right/left travel levers 11 disposed to right/left sides of the driver's seat 7. Depending on positions of the levers 11, the riding-type lawn mower makes a straight travel in the fore/aft direction as well as a pivot turn and a spin turn in an arbitrary manner. The power of the work system branched at the counter case 9 is outputted forward from a PTO shaft 12 which is protruded at a lower-front position of the counter case 9 and is shaft-transmitted to the mower M.

Figure 3:
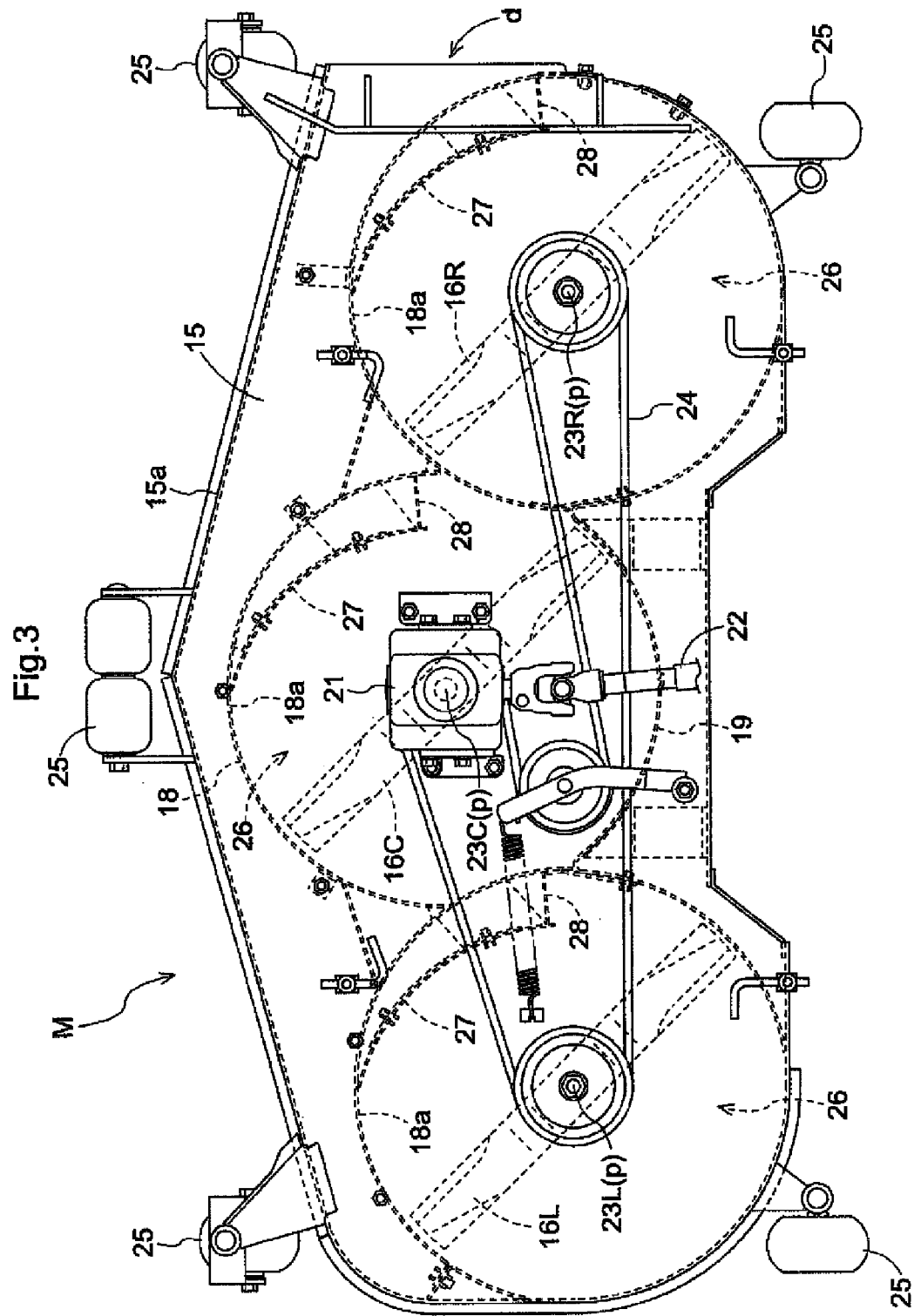
Figure 4:
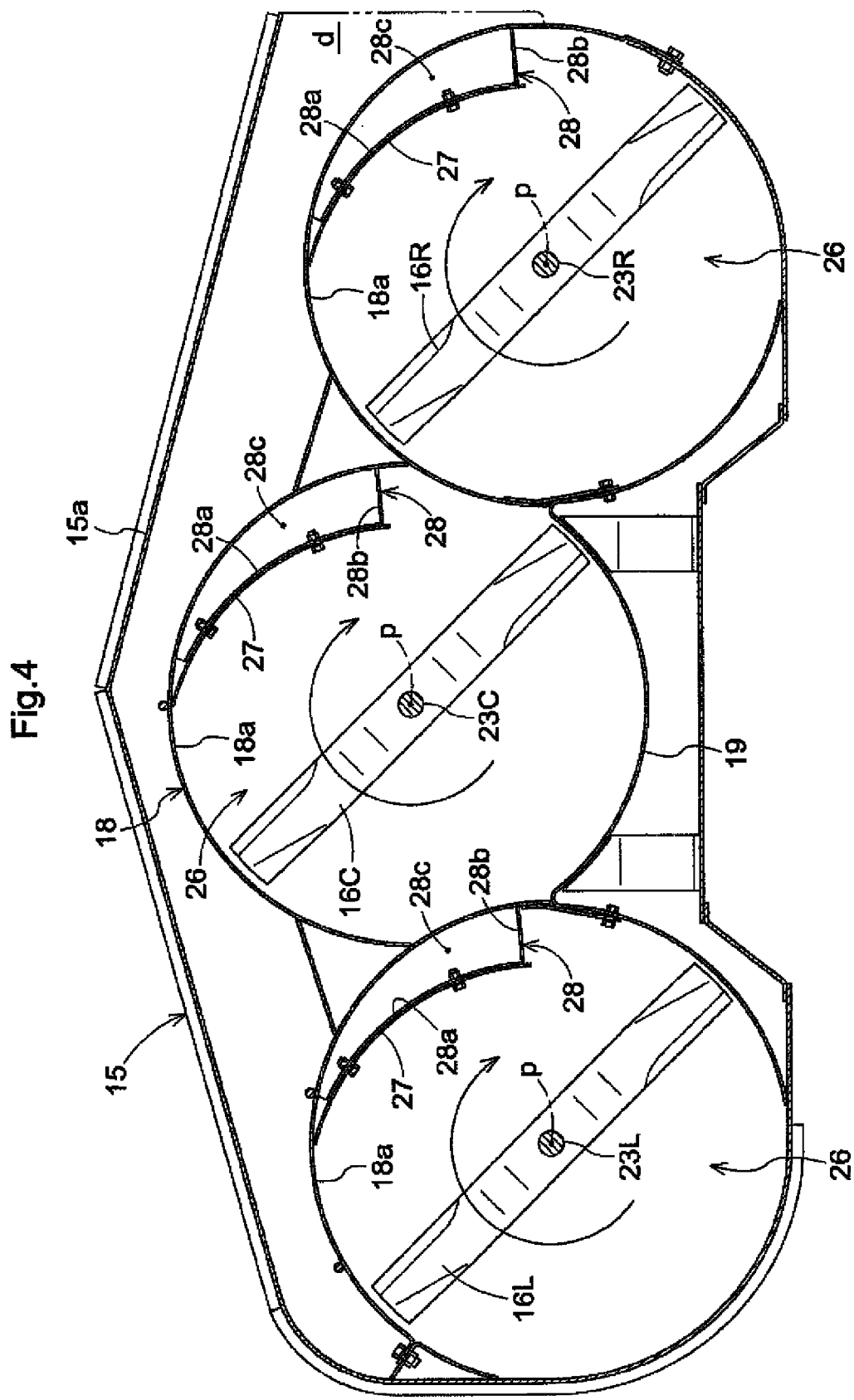

As shown in FIGS. 3 and 4, the mower M has three blades 16L, 16C, 16R rotatably driven about a vertical axis p within a downwardly open mower deck 15. The blades 16L, 16C, 16R are shaft-supported in a triangular arrangement in plan view, with the central blade 16C displaced slightly forward. The right/left ends of rotational loci of two adjacent blades have a fore/aft elongated overlap when the vehicle body 3 moves straight forward, so that no uncut grass is left behind.

The power for the work system taken off of the PTO shaft 12 is transmitted to a bevel gear case 21 on a center upper surface of the mower deck 15 via a pivotable and retractable shaft-transmission mechanism 22. The torque converted to rotation about a vertical axis within the bevel gear case 21 is transmitted to a rotating shaft 23C of the central blade 16C. The rotating shaft 23C and the rotating shafts 23R, 23L of the right/left blades 16R, 16L are interlinked by a belt 24. The blades 16L, 16C, 16R are rotated at a uniform speed in the same direction (clockwise in plan view) so that a forward half each of distal-end rotational loci of the blades 16L, 16C, 16R are directed toward the discharge port d. Idler wheels (anti-scalp rollers) 25 for riding over obstacles are disposed around the mower deck 15. When the mower M suspended by the link mechanism 4 with a play for upward movement approaches a slope, a ridge or the like on the ground, the mower M is relatively raised upward by any one of the anti-scalp rollers 25 riding up the ridge or the like, to prevent a direct contact of the mower deck 15 with the ground and its resulting scraping of the ground.

The illustrated mower M is configured in a mulching mode in which the grass clippings is carried around and finely cut by the blades 16L, 16C, 16R, and deposited behind the mower. In detail, a forward baffle plate 18 (corresponding to a peripheral wall of a cutting chamber), bent in the form of a wave along a front side portion of distal-end rotational locus each of the blades 16L, 16C, 16R, is suspended in the form of a vertical wall at a forward position within the mower deck 15. A rear baffle plate 19, bent in the form of a wave along a rear side portion of the distal-end rotational locus each of the blades 16L, 16C, 16R, is suspended in the form of a vertical wall at a rearward position within the mower deck 15. Cutting chambers 26 of the blades 16L, 16C, 16R are formed independent of one another.

A grass clippings guide 27 is provided in the form of a vertical wall at a forward part within the cutting chambers 26. The grass clippings guide 27 extends oblique-rearward from the right/left center of the forward peripheral wall each of the cutting chambers 26. The more rearward the grass clippings guide 27 extends, the more inward it extends toward a blade rotation center so that the grass clippings flowing at a front half space within each cutting chamber 26 is guided toward the blade rotation center.

The grass clippings is thus carried around and flown within each of the mutually independent cutting chambers 26, guided to the blade rotation center by the grass clippings guide 27 and then slowed down and allowed to drop, which improves carrying and fine-cutting performance of the grass clippings inside each of the cutting chambers 26.

Figure 5:
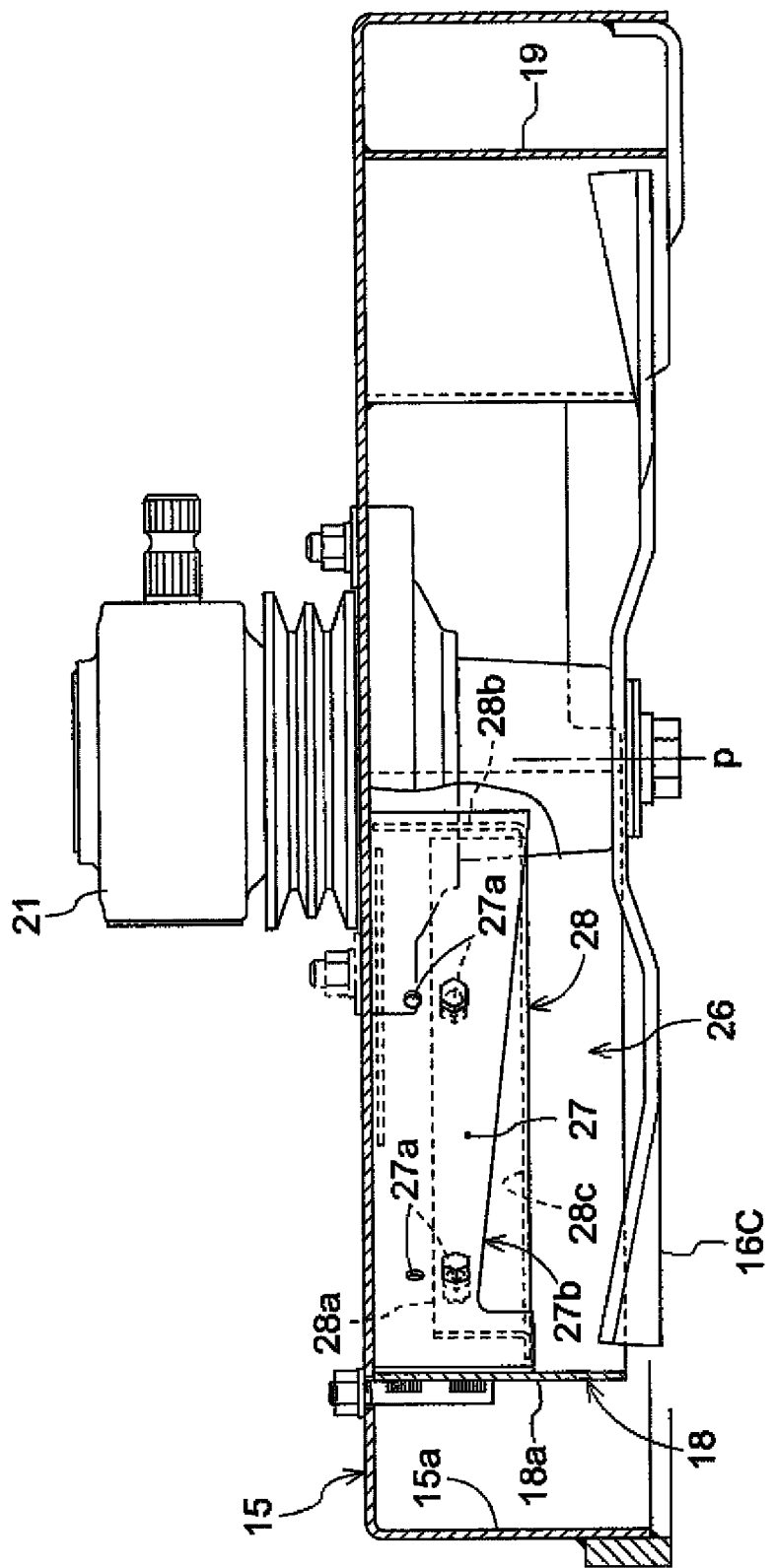
Figure 6:
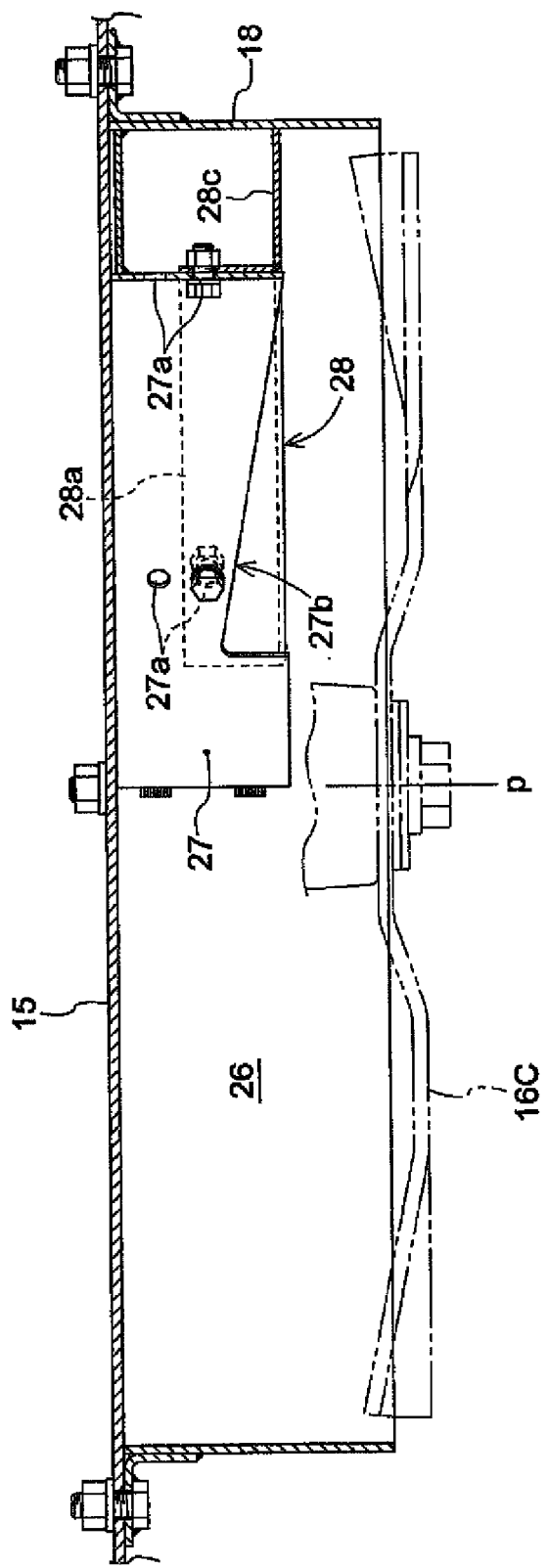
Figure 7:
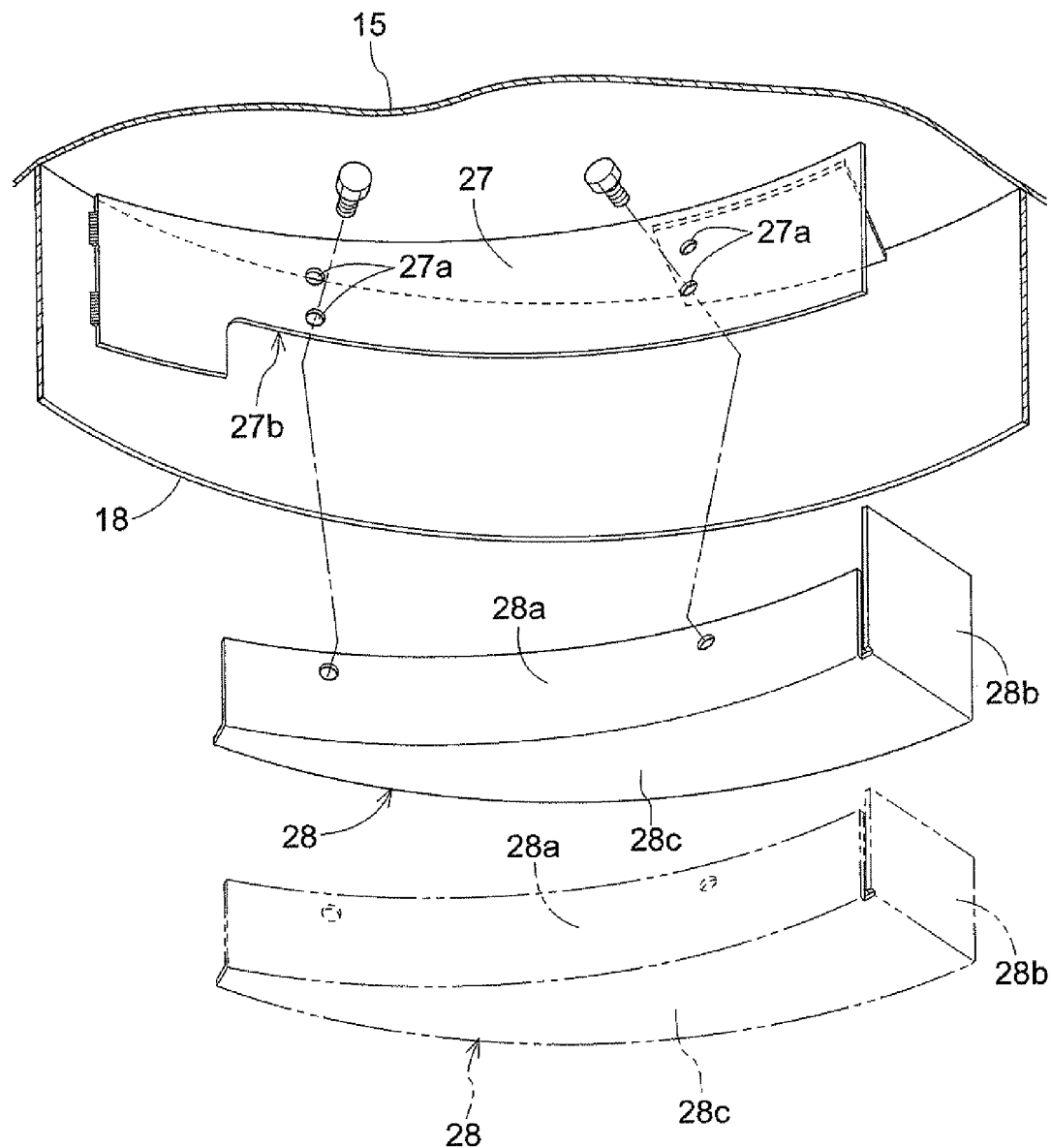
Figure 8:
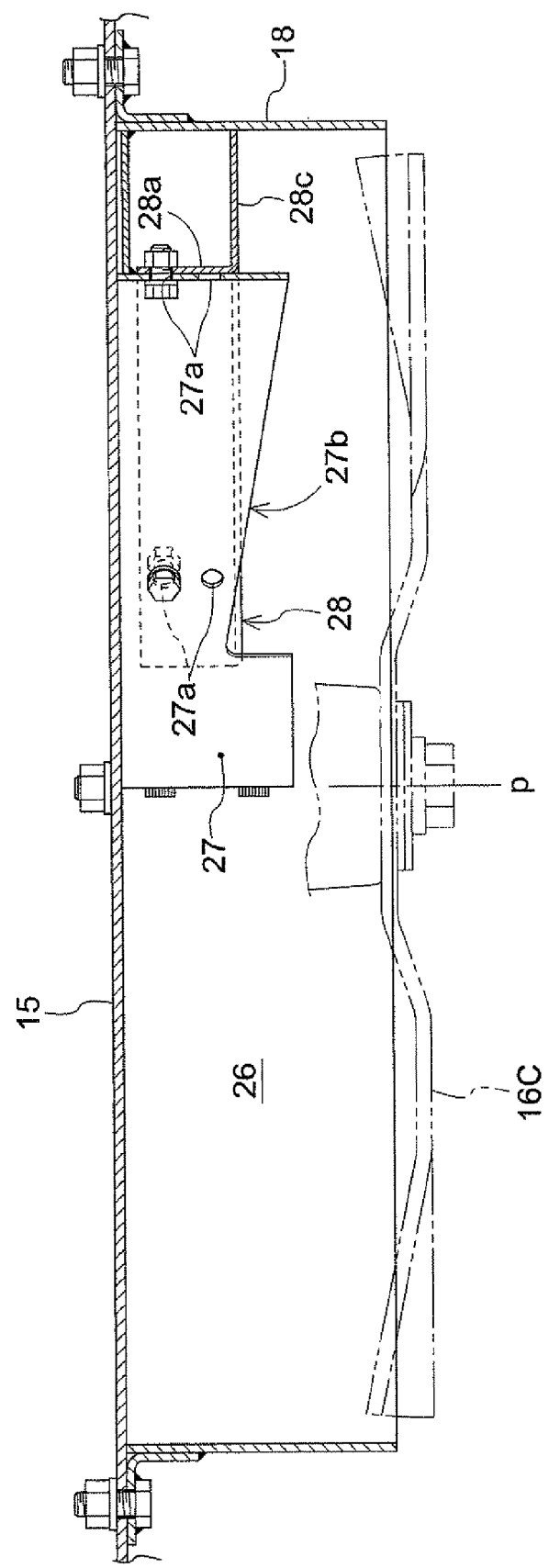
Figure 9:
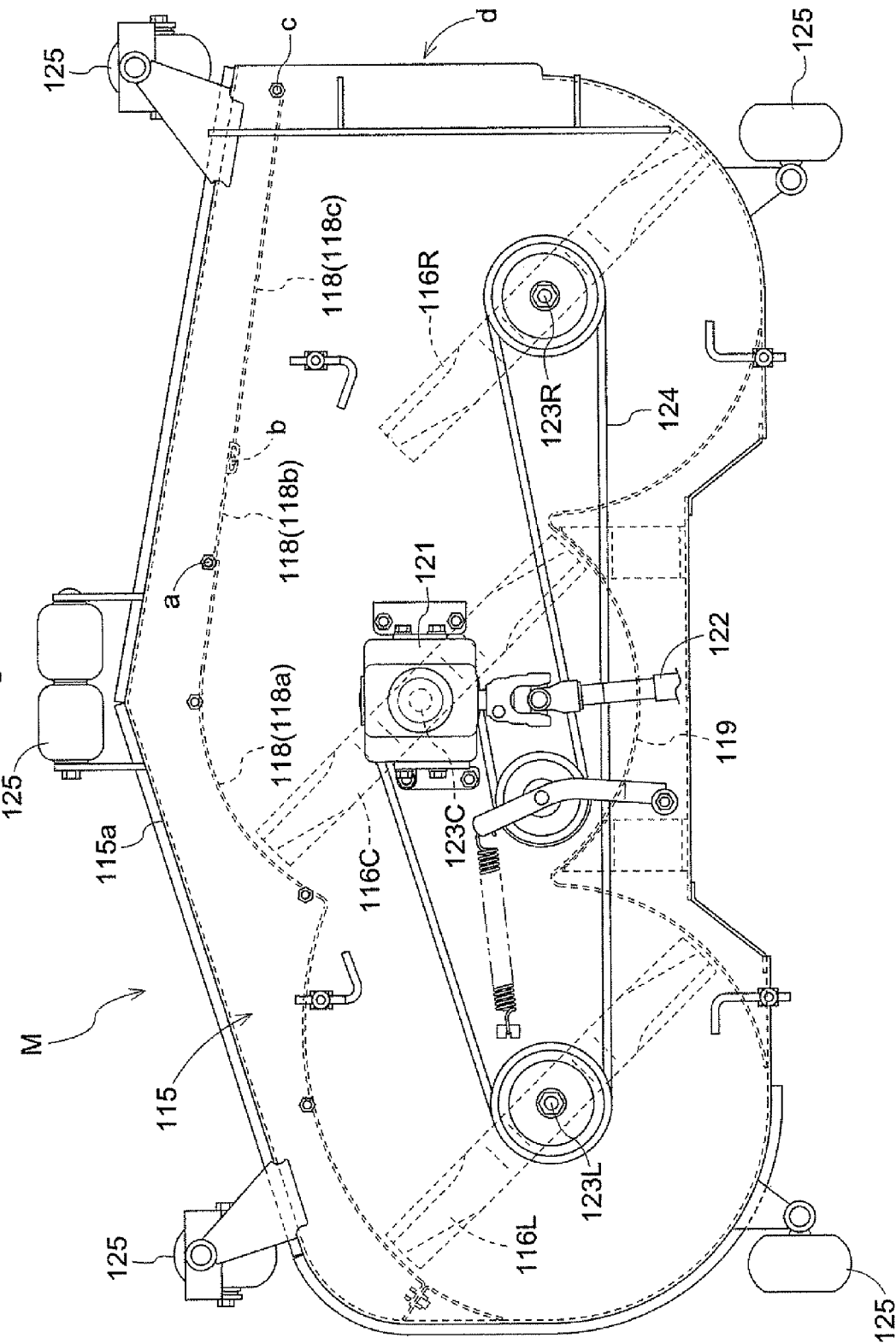
Figure 10:
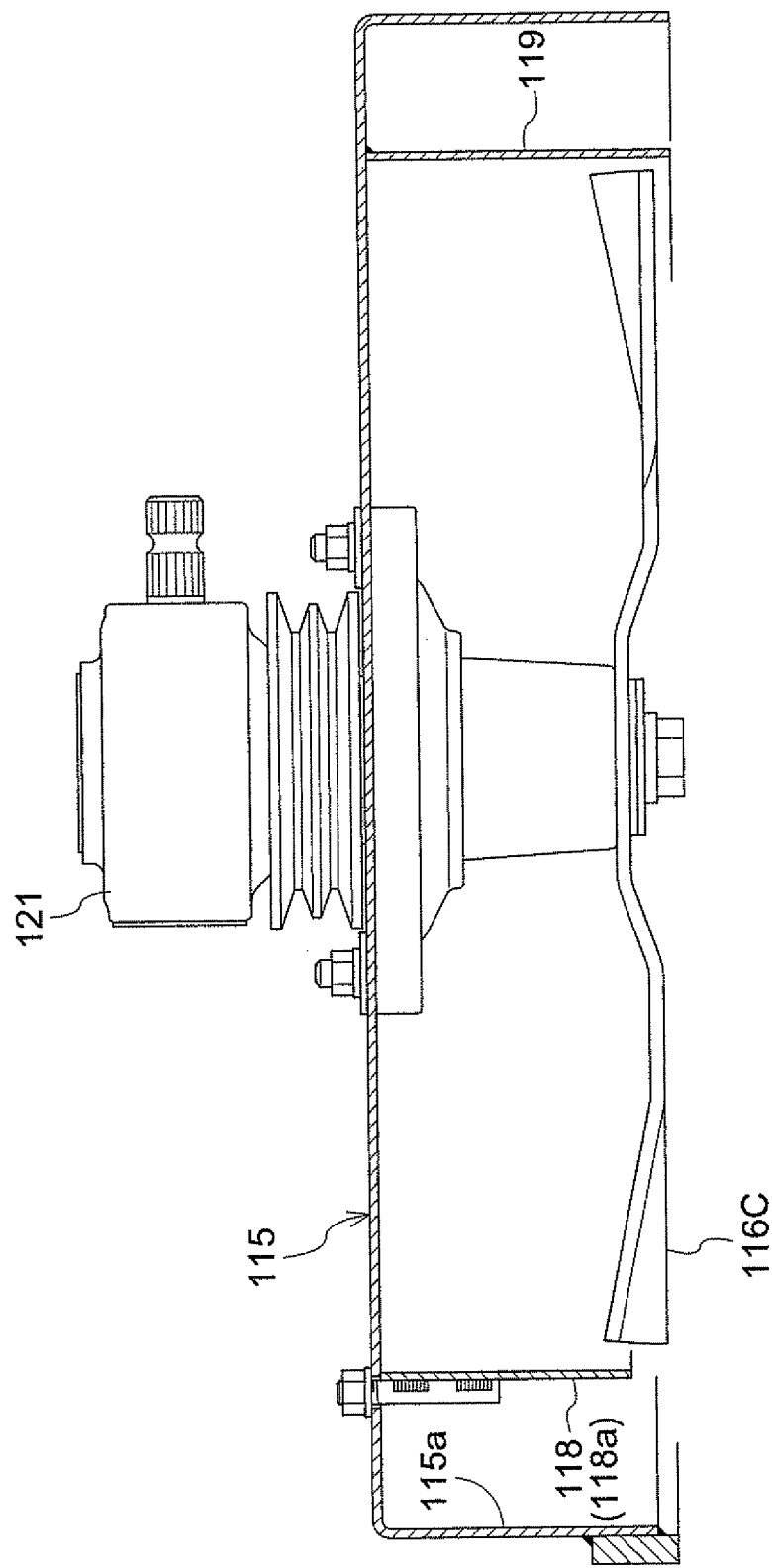

As shown in FIGS. 5 and 6, a wedge shaped space in plan view is present between the grass clippings guide 27 and the forward baffle plate 18, and a shield member 28 is mounted to the wedge-shaped space for preventing grass clippings from entering the wedge-shaped space. As shown in FIG. 7, the shield member 28 includes a connecting wall 28a extending along an outer side of the grass clippings guide 27, a rear wall 28b blocking a rear opening of the wedge-shaped space and a bottom plate 28c blocking the wedge-shaped space from below. The grass clippings guide 27 and the connecting wall 28a are fastened with each other by bolts at two, right and left positions. Two, upper and lower sets of connection holes 27a are defined in the grass clippings guide 27. As shown in FIG. 8 and by a two-dot-and-a-dash line in FIGS. 6 and 7, a height of a bottom of the shield member 28 can be adjusted by selectively mounting, to the upper or lower connection holes 27a, various shield members 28 having different heights of the rear wall 28b.

As shown in FIG. 8, the grass clippings guide 27 has a concave 27b at a lower side thereof. The more rearward grass clipping guide 27 extends, the smaller the concave 27b is recessed. Whereby, when the shield member 28 is mounted in a higher bottom position, a portion of the grass clippings guided rearward by the glass clippings guide 27 is flown under the shield member 28 through the concave 27b. This checks an excessive flow of grass clippings toward the blade rotation center within the cutting chamber 26, to effect a uniform fine-cutting of the grass at central and external regions within the cutting chambers 26.

When the forward baffle plate 18 and the grass clippings guides 27 are removed, grass clippings cut by the blades 16L, 16C, 16R can be guided rightward along the forward peripheral wall 15a of the mower deck 15, and the mowing work can be carried out in a side discharge mode for discharging the grass clippings from the discharge port d opened to a deck right end.

[Other Modes of the First Embodiment]

The present invention can also be implemented in modes such as those described below.

(1) The shield member 28 may also be shaped as a block molded from a resin.

(2) The shield member 28 may be mounted on the forward baffle plate 18 (cutting chamber peripheral wall), or on the forward baffle plate 18 (cutting chamber peripheral wall) and the grass clippings guide 27.

(3) The grass clippings guide 27 and the shield member 28 may be formed integrally.

[Second Embodiment]

A second embodiment will be described next with reference to FIGS. 9 to 15.

In the second embodiment, a mower includes a mower deck 115, a plurality of blades 116L, 116C, 116R arranged side by side to be rotatable about a vertical axis inside the mower deck 115, and a forward baffle plate 118 extending along rotational loci of the blades 116L, 116C, 116R, wherein the forward baffle plate 118 is switchable between a first orientation x proximate to rotational loci of the blades 116L, 116C, 116R and a second orientation y away form the rotational loci.

It is preferred that the forward baffle plate 118 be bent and deformed to be switchable between the first orientation x and the second orientation y.

It is also preferred that the forward baffle plate 118 be pivoted about the pivots e, f located upstream in a discharge direction of the grass clippings, to be switchable between the first orientation x and the second orientation y.

The second embodiment will be described in more detail hereinafter.

As shown in FIGS. 9-13, the mower M has three blades 116L, 116C, 116R rotatable about a vertical axis inside a downwardly open mower deck 115. The blades 116L, 116C, 116R are shaft-supported in a triangular arrangement in plan view, with the central blade 116C displaced slightly forward. The right/left ends of rotational loci of two adjacent blades have a fore/aft elongated overlap when the vehicle body 3 moves straight forward, so that no uncut grass is left behind.

The mower deck 115 is configured as a flat deck having an overall same ceiling height, and has a discharge port d formed at a right end thereof.

The mower deck 115 has a forward baffle plate 118 and a rear baffle plate 119 suspended, each in form of a vertical wall, from inner front/rear sides thereof and extending along front/rear sides of distal-end rotational loci of the blades 116L, 116C, 116R, respectively. The mower deck 115 has a continuous cutting space elongated in the right/left direction by communicating cutting chambers of the blades 116L, 116C, 116R with one another.

The power for the work system (implement driving system) is taken off of the PTO shaft 12 (see FIG. 1), and is transmitted to a bevel gear case 121 mounted on a center upper surface of the mower deck 115 via a pivotable and retractable shaft-transmission mechanism 122. The torque converted to rotation about a vertical axis in the bevel gear case 121 is transmitted to a rotating shaft 123C of the central blade 116C. The rotating shaft 123C and the rotating shafts 123R, 123L of the right/left blades 116R, 116L are interlinked by a belt 124 wound around these shafts 123C, 123R, 123L. The blades 116L, 116C, 116R are rotatable at a uniform speed in the same direction (clockwise in plan view) so that a forward half each of distal-end rotational loci of the blades 116L, 116C, 116R are directed toward the discharge port d. Idler wheels (anti-scalp rollers) 125 for riding over obstacles are disposed around the mower deck 115. When the mower M supported in suspended form by the link mechanism 4 (FIG. 1) with a play for upward movement approaches a slope, a ridge or the like on the ground, the mower M is relatively raised upward by any one of the anti-scalp rollers 125 riding up the ridge or the like, to prevent a direct contact of the mower deck 115 with the ground and its resulting scraping of the ground.

The forward baffle plate 118 is configured in the following manner. A portion facing the central blade 116C and the left blade 116L of the forward baffle plate 118 that forms the forward peripheral wall is composed of a fixed plate 118a that is fixed in a predetermined orientation. On the other hand, a portion of the forward baffle plate 118 facing the right blade 16R is includes a first movable plate 118b having a smaller right/left length and a second movable plate 118c having a larger right/left length which movable plates 118b, 118c are interconnected by a pin to be deformable by flexing the two plates 118b, 118c about the pin.

The first movable plate 118b has its left end connected to a right end of the fixed plate 118a so that the first movable plate 118b may be pivotably flexed fore and aft about a fixed pivot a. The first movable plate 118b and a left end of the second movable plate 118c are supported and connected by upper and lower elongated slots 126 and a link pin 127 extending between and through the two slots 126 so that the two moveable plates 118b, 118c may be flexed fore and aft about a moveable pivot b. The second moveable plate 118c has its right end supported and connected in the vicinity of the discharge port d so that the second moveable plate 118c may be flexed fore and aft about a fixed pivot c.

With the above described structure of the mower M, mowing performance is adjustable in the manner described below by flexing and deforming the first and second moveable plate 118b, 118c of the forward baffle plate 118.

Figure 11:
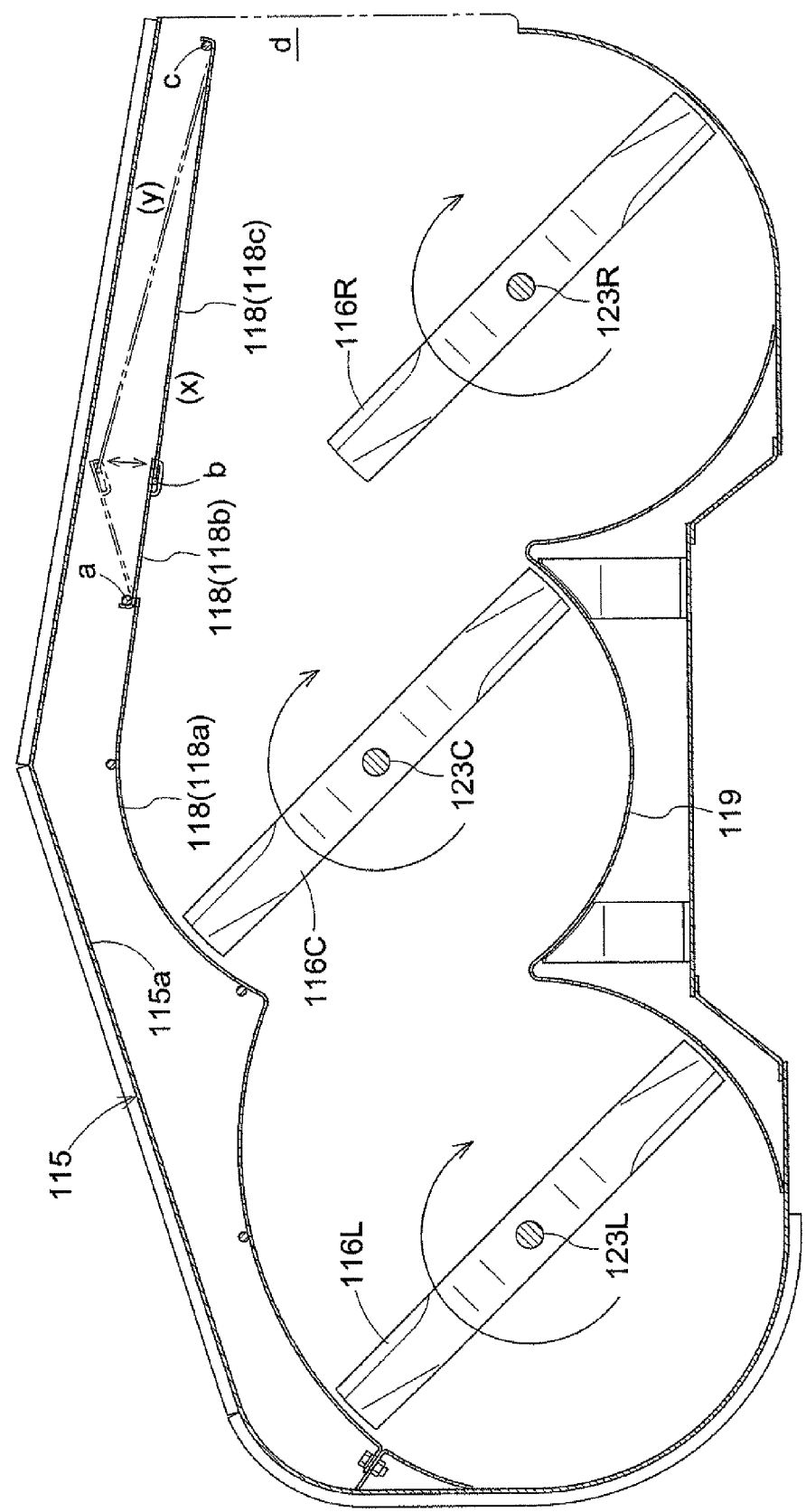

With reference to FIG. 11 a when the first moveable plate 118b of the forward baffle plate 118 is switched straight to a first orientation (x) closer to the distal-end rotational locus of the right blade 116R, the grass clippings cut by the blades 116L, 116C, 116R and moving along the forward baffle plate 118 flow smoothly to the discharge port d with smaller resistance to improve the grass clippings discharge performance.

Figure 12:
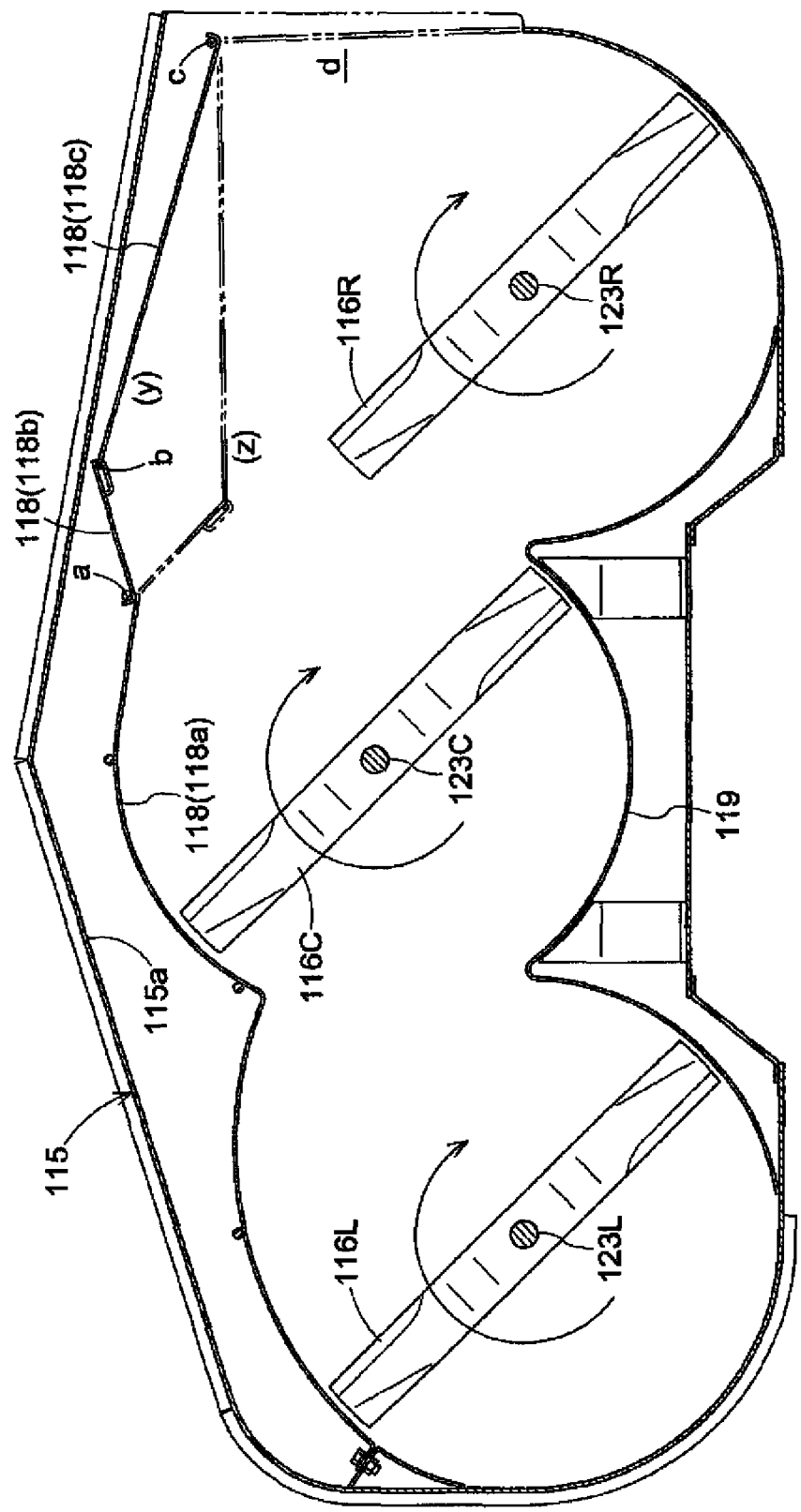
Figure 13:
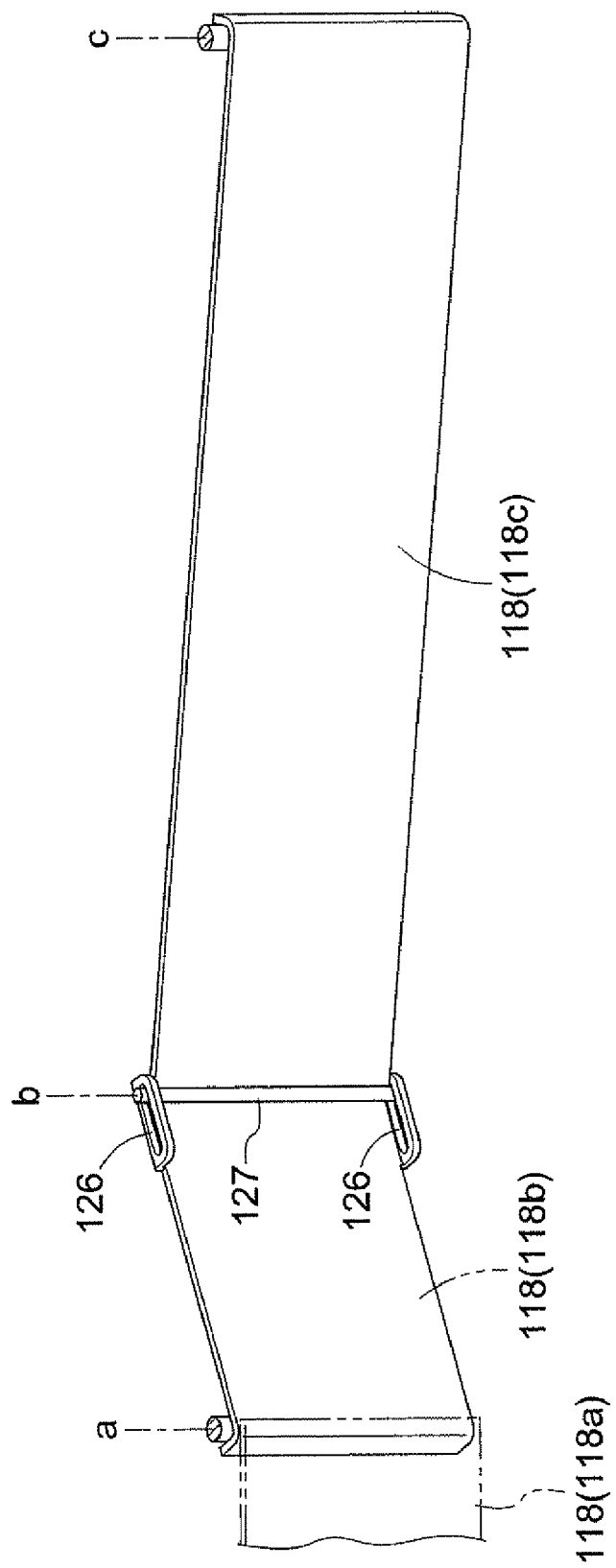

With reference to FIG. 12, when the first moveable plate 118b of the forward baffle plate 18 is flexed forward and switched to a second orientation (y) remote from the distal-end rotational locus of the right rotational blade 116R, the space between the distal-end rotational locus of the right rotational blade 116R and the forward baffle plate 118 becomes larger fore and aft between the center rotational blade 116C and the right rotational blade 116R. Then, the grass, entered this space in a fallen down posture under a lower end of the forward baffle plate 118, can easily stand erect, to improve mowing performance without leaving uncut grass behind.

As shown in an imaginary line in FIG. 12, the first and second moveable plates 118b, 118c of the forward baffle plate 118 can be further flexed to a third orientation (z) protruding further rearward. In the third orientation (z), when mulching work is carried out with the discharge port d blocked and the grass clippings carried around and finely cut in the cutting chambers of the blades 116L, 116C, 116R, the grass clippings can be retained by the blades 116L, 116C, 116R for a longer period of time, so that the grass can be finely cut in an adequate manner.

[Other Modes of the Second Embodiment]

The second embodiment of the present invention can also be implemented in modes such as those described below.

Figure 14:
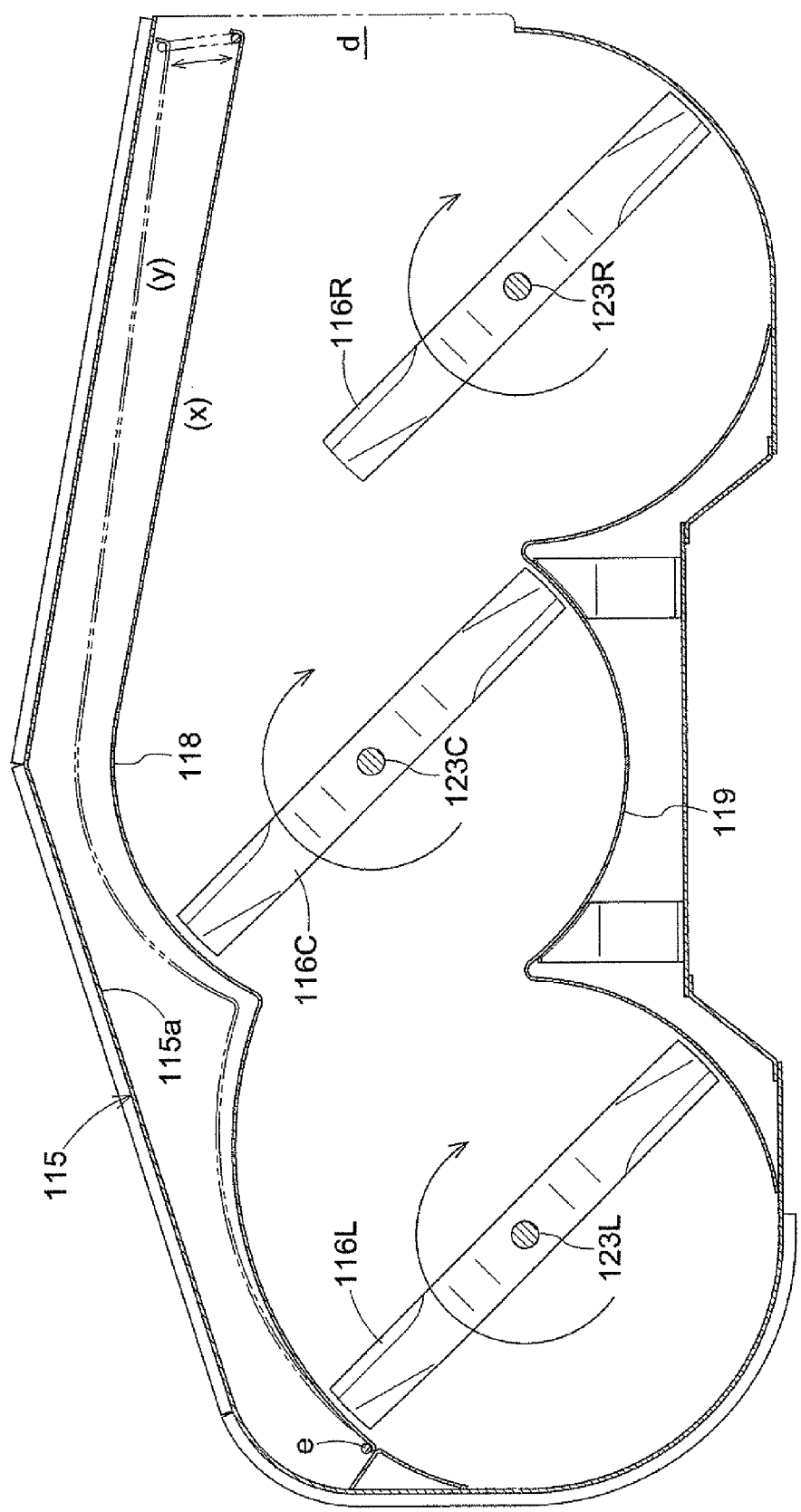

(1) With reference to FIG. 14, the forward baffle plate 118 has a predetermined shape with a discharge side portion thereof formed straight. The forward baffle plate 118 is pivotable fore and aft about a pivot e disposed at an upstream side (a side opposite from the discharge port d) in a discharge direction of the grass clippings. Then, the forward baffle plate 118 is switchable between the first orientation closer to the distal-end rotational loci of the blades 116L, 116C, 116k, and the second orientation remote from the distal-end rotational loci. This configuration also allows the same functions as described above.

Figure 15:
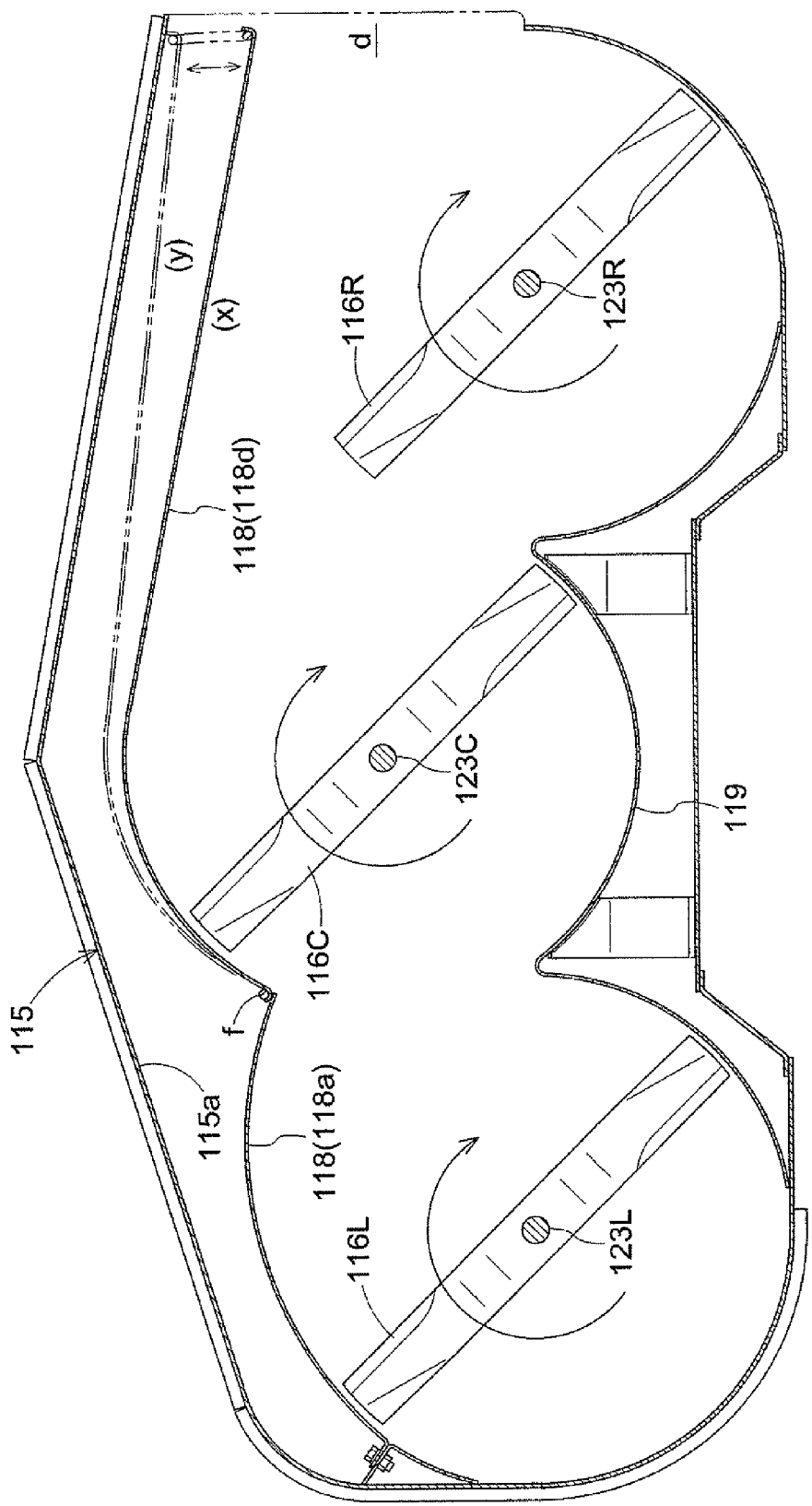

(2) With reference to FIG. 15, the forward baffle plate 118 includes a fixed plate 118a secured in place in opposition to the left rotational blade 116L, and a moveable plate 118d in opposition to the center rotational blade 116C and the right rotational blade 116R. The moveable plate 118d is pivotable fore and aft about a pivot f disposed at a right end of the fixed plate 118a. So that, a portion of the forward baffle plate 118 downstream in the discharge direction of the grass clippings can be switchable between the first orientation closer to the distal-end rotational loci of the blades 116C, 116R, and the second orientation remote form the distal-end rotational loci. This configuration also allows the same functions as described above.

[Third Embodiment]

A third embodiment will be described next with reference to FIGS. 16 to 22.

In the third embodiment, a mower includes a mower deck 215, a cutting chamber 228 formed within the mower deck 215, and a plurality of blades 216L, 216C, 216R arranged in the cutting chamber 228 in a lateral direction to each be rotatable about a vertical axis, wherein a portion of a forward peripheral wall of the cutting chamber 228 which is located in front of a boundary (an intermediate location) of adjacent blades is height-adjustable from the ground.

It is preferred that a forward baffle plate 218 extend along rotational loci of the blades 216L, 216C, 216R at a forward position within the mower deck 215, to form the forward peripheral wall of the cutting chamber 228.

The third embodiment will be described in more detail hereinafter.

Figure 16:
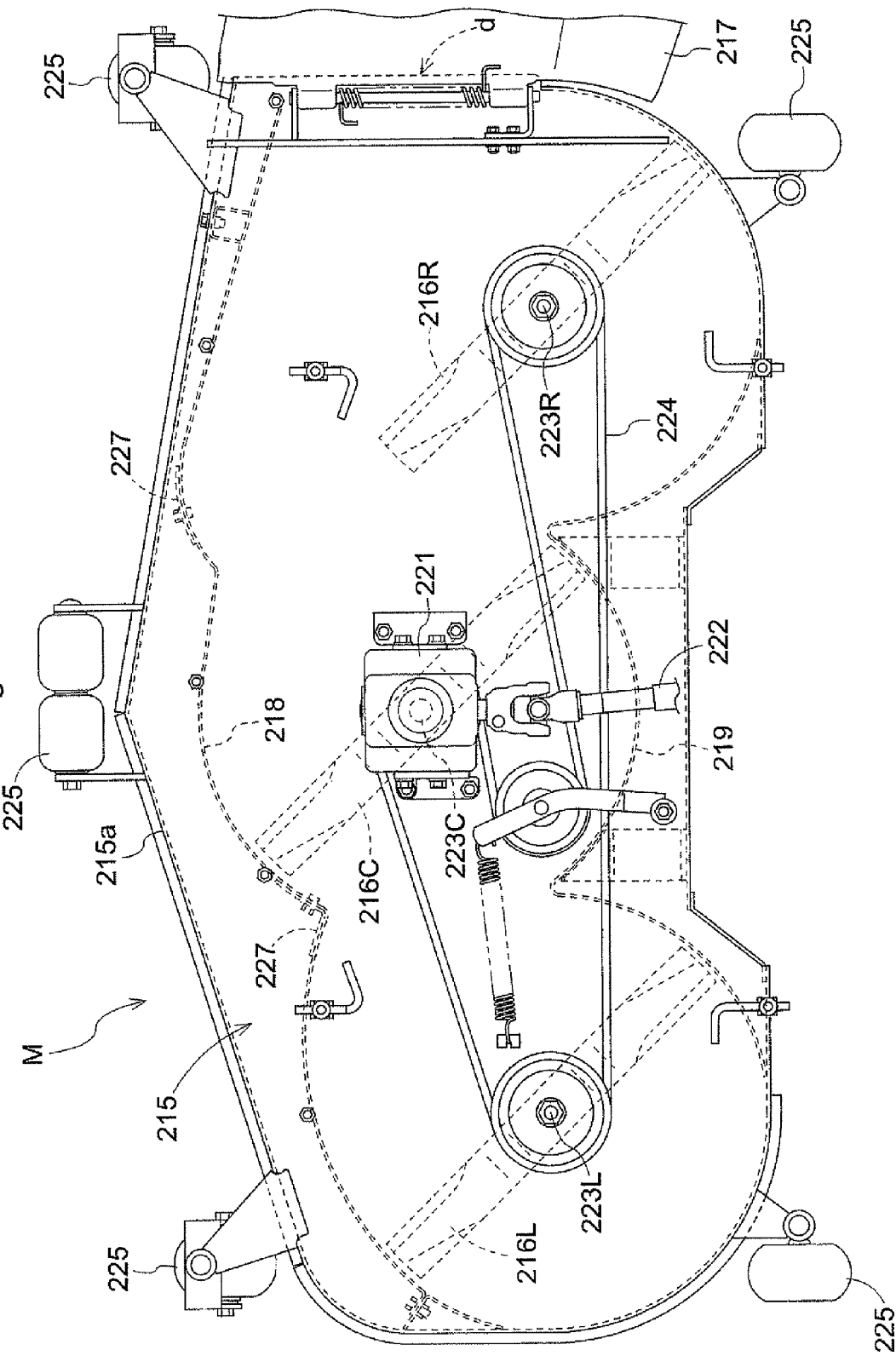
Figure 17:
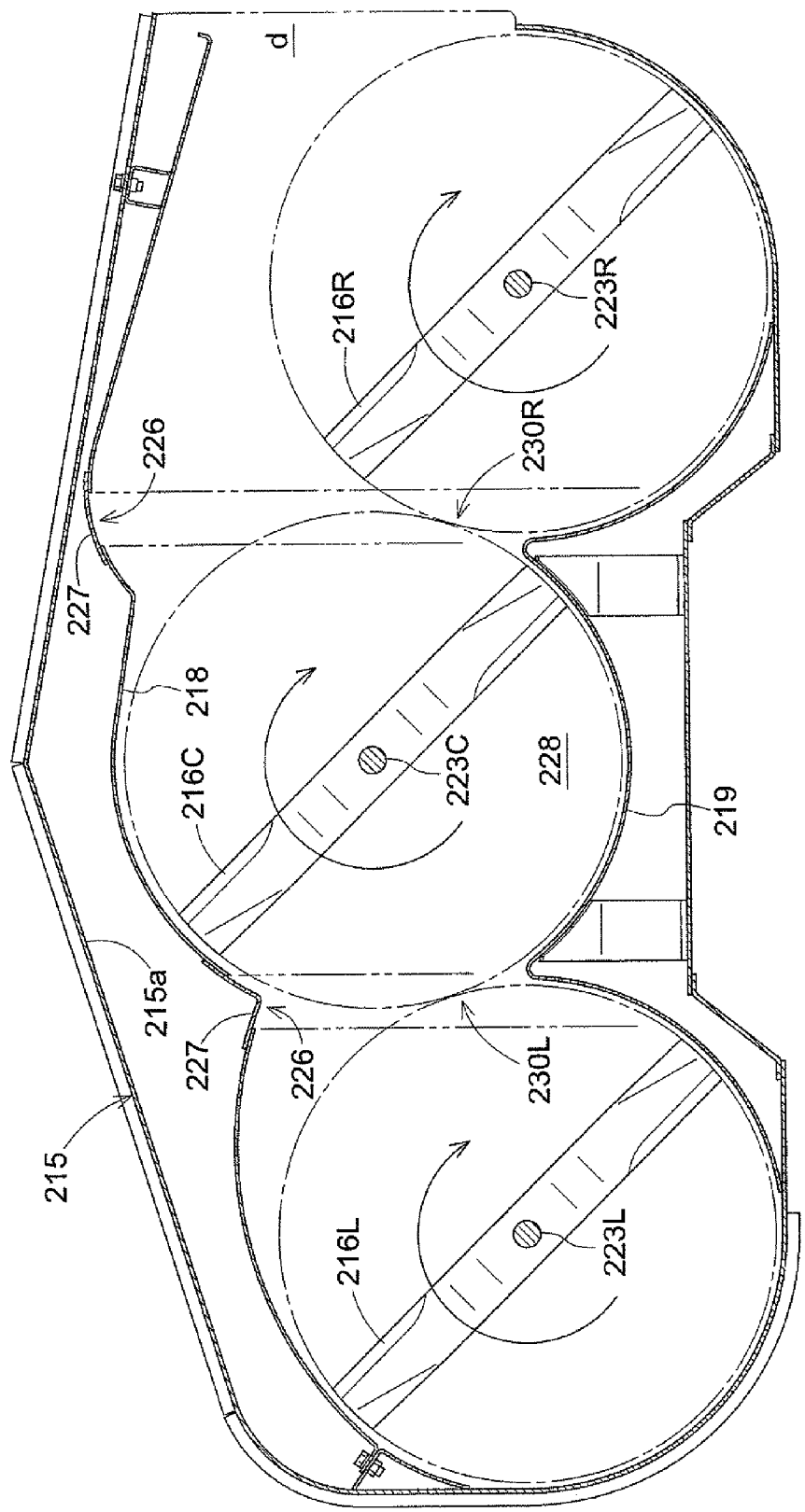

FIG. 16 shows a plan view of the mower M having a side discharge specification. FIG. 17 shows a transverse sectional plan view of this mower M. The mower M has three blades 216L, 216C, 216R rotatable about a vertical axis within a downwardly open mower deck 215. The blades 216L, 216C, 216R are shaft-supported in a triangular arrangement in plan view, with the central blade 216C displaced slightly forward. The right/left ends of rotational loci of two adjacent blades have a fore/aft elongated overlap (intermediate locations 230R, 230L) when the vehicle body 3 moves straight forward, so that no uncut grass is left behind.

The mower deck 215 is configured as a flat deck having the same ceiling height overall. The mower deck 215 has a discharge port d formed at a right end thereof with a discharge cover 217 for preventing upward dispersing of the grass clippings.

A forward baffle plate 218, bent in the form of a wave along a front side portion of distal-end rotational locus each of the blades 216L, 216C, 216R is suspended in the form of a vertical wall at a forward position within the mower deck 215. A rear baffle plate 219, bent in the form of a wave along a rear side portion of the distal-end rotational locus each of the blades 216L, 216C, 216R, is suspended in the form of a vertical wall at a rearward position within the mower deck 215. The mower deck 215 has a continuous cutting space elongated in the right/left direction by communicating cutting chambers of the blades 216L, 216C, 216R with one another.

The power for the work system taken off of the PTO shaft 12 (FIG. 1) is transmitted to a bevel gear case 221 on a center upper surface of the mower deck 215 via a pivotable and retractable shaft-transmission mechanism 222. The torque converted to rotation about a vertical axis within the bevel gear case 221 is transmitted to a rotating shaft 223C of the central blade 216C. The rotating shaft 223C and the rotating shafts 223R, 223L of the right/left blades 216R, 216L are interlinked by a belt 224 wound around the shafts 223R, 223C, 223L. The blades 216L, 216C, 216R are rotated at a uniform speed in the same direction (clockwise in plan view) so that a forward half each of distal-end rotational loci of the blades 216L, 216C, 216R are directed toward the discharge port d. Idler wheels (anti-scalp rollers) 225 for riding over obstacles are disposed around the mower deck 215. When the mower M suspended by the link mechanism 4 (FIG. 1) with a play for upward movement approaches a slope, a ridge or the like on the ground, the mower M is relatively raised upward by any one of the anti-scalp rollers 225 riding up the ridge or the like, to prevent a direct contact of the mower deck 215 with the ground and its resulting scraping of the ground.

Figure 18:
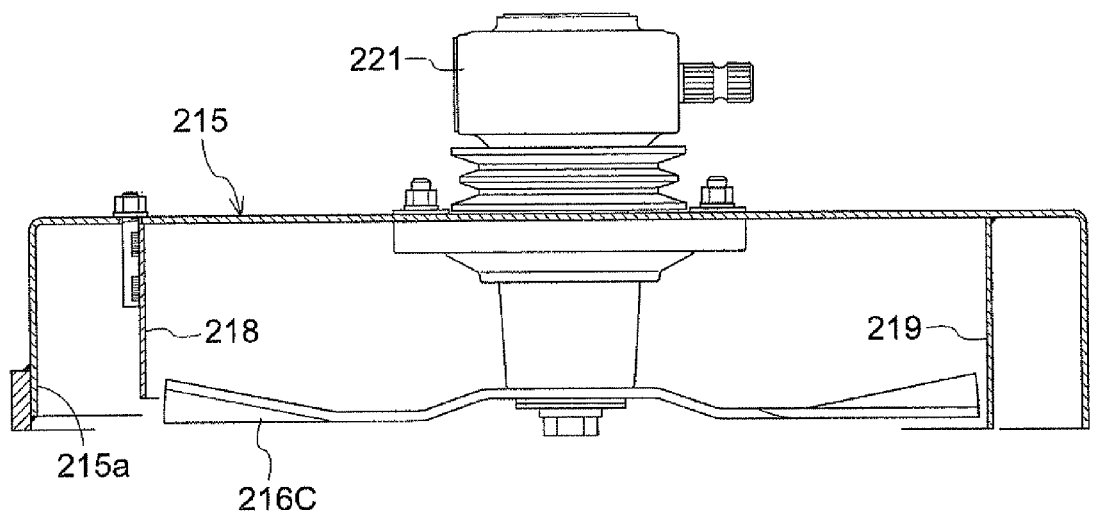
Figure 19:
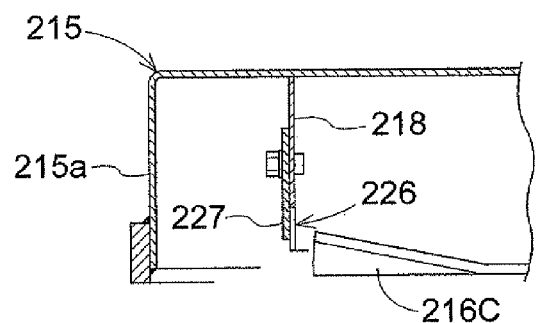
Figure 20:
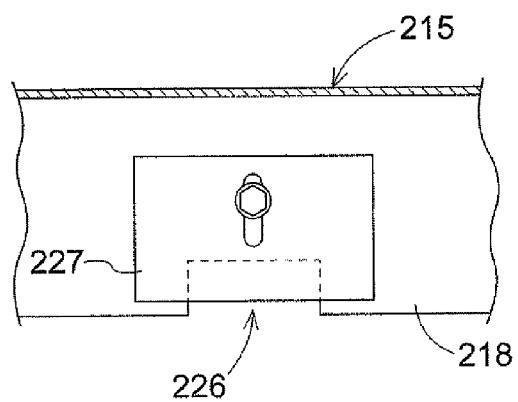

The forward baffle plate 218 is configured in following manners. With reference to FIG. 18, a lower end of the forward baffle plate 218 forming the forward peripheral wall of the cutting chamber 228 is set to be slightly higher than a lower end of a forward peripheral wall 215a of the mower deck 215. As shown in FIGS. 19 and 20, a downwardly opening concave 226 is formed at a position forwardly of the intermediate location 230L between the left rotational blade 216L and the center rotational blade 216C, and at a position forwardly of the intermediate location 23OR between the center rotational blade 216C and the right rotational blade 216R. An adjustment plate 227 for blocking the concave 226 is mounted to be vertically adjustable. Vertically adjusting the adjustment plate 227 along a vertical slot formed in the forward baffle plate 218 changes the ground height of the lower end of the adjustment plate 227, i.e. the ground height at the concave 226 of the forward baffle plate 218.

In a mower M in the side discharge specification described above, the grass clippings cut by the blades 216L, 216C, 216R are dispersed and transported toward the right side in FIG. 16 along the ceiling and the forward baffle plate 218 forming the forward peripheral wall of the cutting chamber 228, and discharged from the discharge port d.

In this case, the grass erectly growing on the ground is pushed and fallen down forward by the forward peripheral wall 215a of the mower deck 215 and the forward baffle plate 218 during a forward travel and movement of the mower deck 215, comes under lower ends of the forward peripheral wall 215a and the forward baffle plate 218 and introduced into the cutting chamber 228. Since the lower end of the forward baffle plate 218 is entirely slightly higher than the forward peripheral wall 215a of the mower deck 215, the grass is gently pushed down by the forward baffle plate 218, and subsequently the grass having passed under the forward baffle plate 218 is rapidly returned to an erect orientation and reliably cut by the blades 216L, 216C, 216R.

The lower end of the forward peripheral wall 215a of the mower deck 215 is low, which regulates forward escape of the transport wind generated by the blades 216L, 216C, 216R to maintain high discharge performance of the grass clippings from the discharge port d, as well as high performance for preventing forward ejection of small pebbles and branches out of the mower deck 215.

Turbulence tends to be generated at the intermediate locations 230R, 230L of adjacent blades 216C, 216R and adjacent blades 216L, 216C, since the adjacent blades 216C, 216R and adjacent blades 216L, 216C move in opposite directions. This results in unstable erect orientation of the grass and reduced cutting performance. To counteract these, concaves 226 are formed at the lower end of the forward baffle plate 218 to raise the ground height at these locations. Since the downfall of the grass is less likely at the concaves 226, the grass having passed through the forward baffle plate 218 rapidly stands erect and undergoes cutting by the blades 216L, 216C, 216K, which reduces occurrence of uncut grass at the intermediate locations 230R, 230L of adjacent blades 216L, 216C, 216R.

Figure 21:
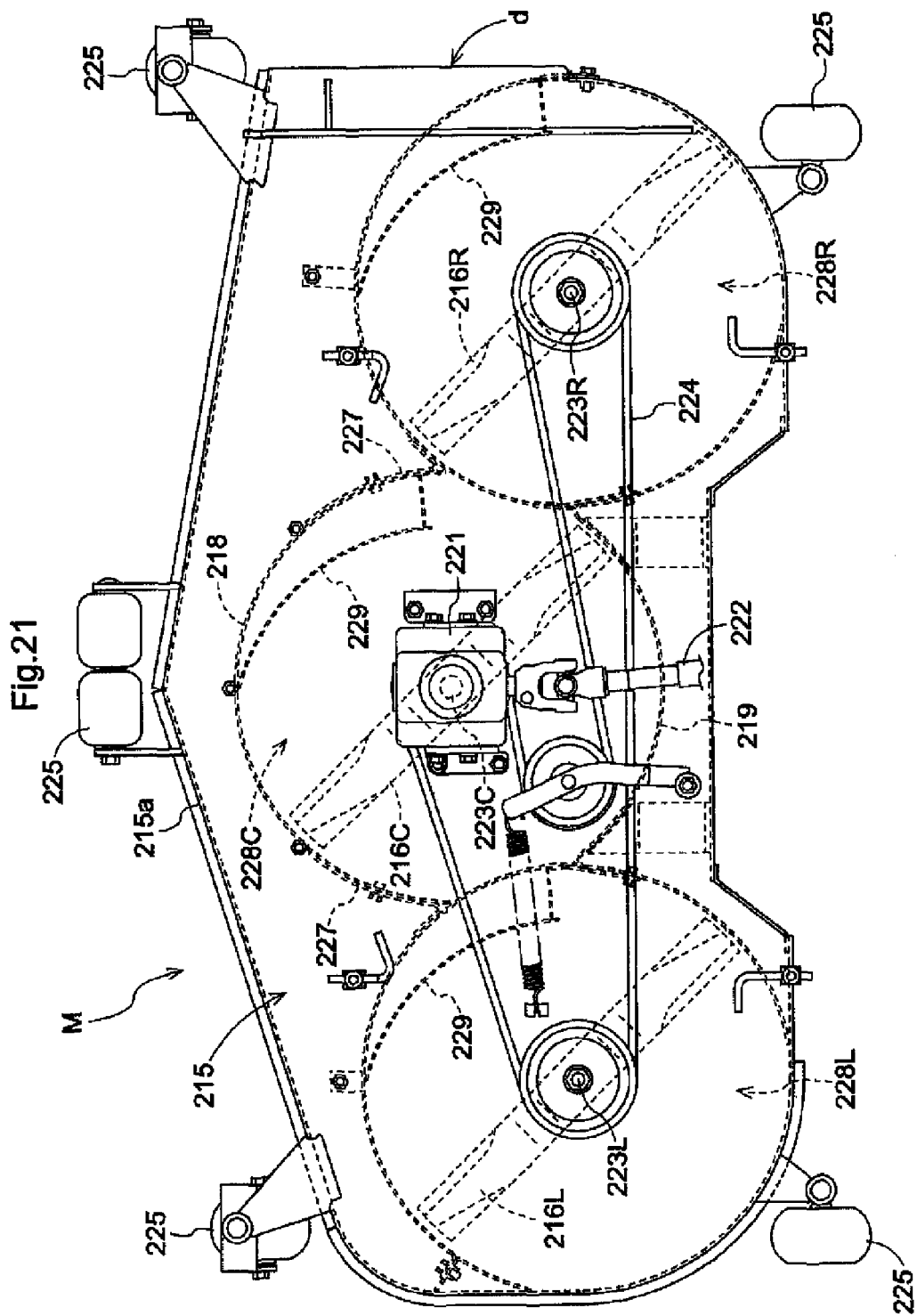
Figure 22:
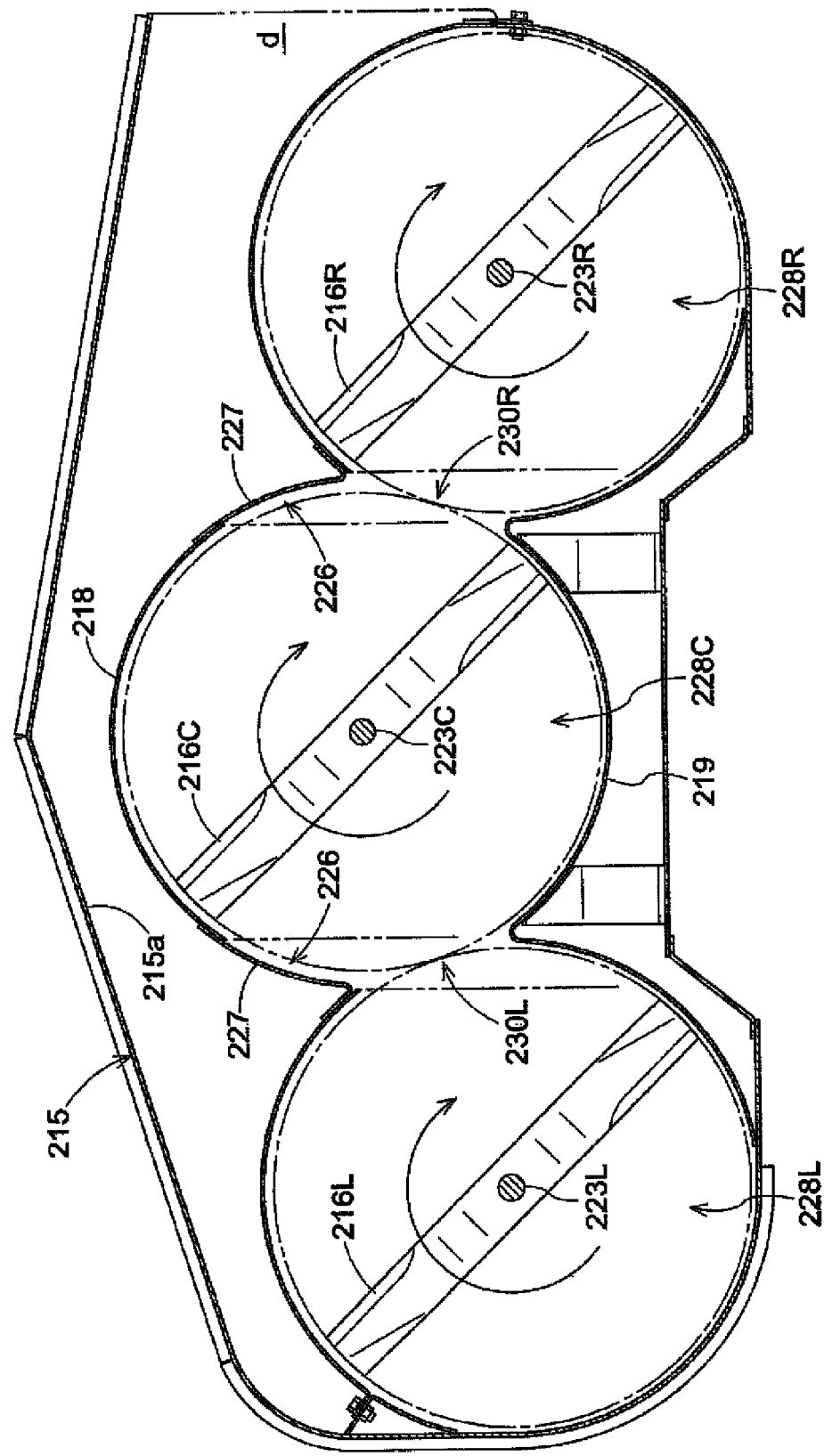

On the other hand, FIGS. 21 and 22 show a plan view and a transverse sectional plan view of a mower M configured according to a mulching specification in place of the side discharge specification. In this case, the forward baffle plate 218 formed with a mulching specification is mounted on the ceiling of the mower deck 215, and the rear baffle plate 219. In the mulching specification, the forward and rear baffle plates 218, 219 cooperate to form circular cutting chambers (fine-cutting chambers) 228L, 228C, 228R partitioned for each of the blades 216L, 216C, 216R, to enclose entire periphery each of the distal-end rotational locus of the blades 216L, 216C, 216R. A grass clippings guide 229 for guiding grass clippings toward a rotational center each blade is provided to the forward baffle plate 218 in each of the cutting chambers 228L, 228C, 228R. The blades 216L, 216C, 216R are adapted to carry the grass clippings around in each of the cutting chambers 228L, 228C, 228R repeatedly to finely cut the grass clippings.

In the mulching specification as well, as shown in FIGS. 19 and 20, a downwardly opening concave 226 is formed at a position forwardly of the intermediate location 230L between the left rotational blade 216L and the center rotational blade 216C, and at a position forwardly of the intermediate location 23 OR between the center rotational blade 216C and the right rotational blade 216R. An adjustment plate 227 for blocking the concave 226 is mounted to be vertically adjustable. Vertically adjusting the adjustment plate 227 along a vertical slot formed in the forward baffle plate 218 changes the ground height of the lower end of the adjustment plate 227, i.e. the ground height at the concave 226 of the forward baffle plate 218.

In operation of mowing work according to the side discharge and mulching specifications described above, the adjustment plate 227 in the forward baffle plate 218 is adjusted in following manners. When cutting tall and rigid grass, for example, turbulence tends to be generated at the intermediate locations 230R, 230L of adjacent blades 216C, 216R and adjacent blades 216L, 216C, since the adjacent blades 216C, 216R and adjacent blades 216L, 216C move in opposite directions. This results in unstable erect orientation of the grass and reduced cutting performance. To counteract these, the adjustment plate 227 is moved and adjusted upward over a considerable distance forwardly of the intermediate locations 230R, 230L of the adjacent blades 216L, 216C, 216R. Then, since the downfall of the grass is less likely, at the concaves 226, the grass having passed through the forward baffle plate 218 rapidly stands erect and undergoes cutting by the blades 216L, 216C, 216R, which reduces occurrence of uncut grass at the intermediate locations 230R, 230L of adjacent blades 216L, 216C, 216R.

When cutting flexible or soft grass, the adjustment plate 227 is moved and adjusted downward, to bring the ground height of the forward baffle plate 218 is closer to the ground height of areas without concaves, at locations positioned forward of the intermediate locations 230R, 230L of adjacent blades 216L, 216C, 216R. This enhances an upward vacuum effect occurring when rotation of the blades 216L, 216C, 216R at these locations, which reliably erects soft grass having passed under the lower end of the adjustment plate 227 in a downfall posture under the strong vacuum effect.

[Other Modes of the Third Embodiment]

The third embodiment of the present invention can also be implemented in modes such as those described below.

(1) The adjustment plate 227 can be configured to be vertically movable and adjustable by a jack bolt or the like operable from above the mower deck 215.

(2) In the embodiment described above, a mower M having three blades 216L, 216C, 216R is illustrated and described. It is also possible to make application to a mower M having two blades.

[Fourth Embodiment]

A fourth embodiment will be described next with reference to FIGS. 23 to 27.

In the fourth embodiment, a mower includes a mower deck 315, a plurality of cutting chambers mutually communicated and arranged in a lateral direction within the mower deck 315, and a blade 316L, 316C, 316R mounted within each of the cutting chambers to be rotatable about a vertical axis, wherein a grass clippings guide member 331 is mounted at a location communicating adjacent cutting chambers, the guide member being retractable by sliding along a peripheral wall of the cutting chambers.

It is preferred that the grass clippings guide member 331 be moveable between a side discharge position for opening the communication location of adjacent cutting chambers, and a mulching position for blocking the communication location so that each of the cutting chambers becomes independent.

The fourth embodiment will be described in more detail hereinafter.

Figure 29:
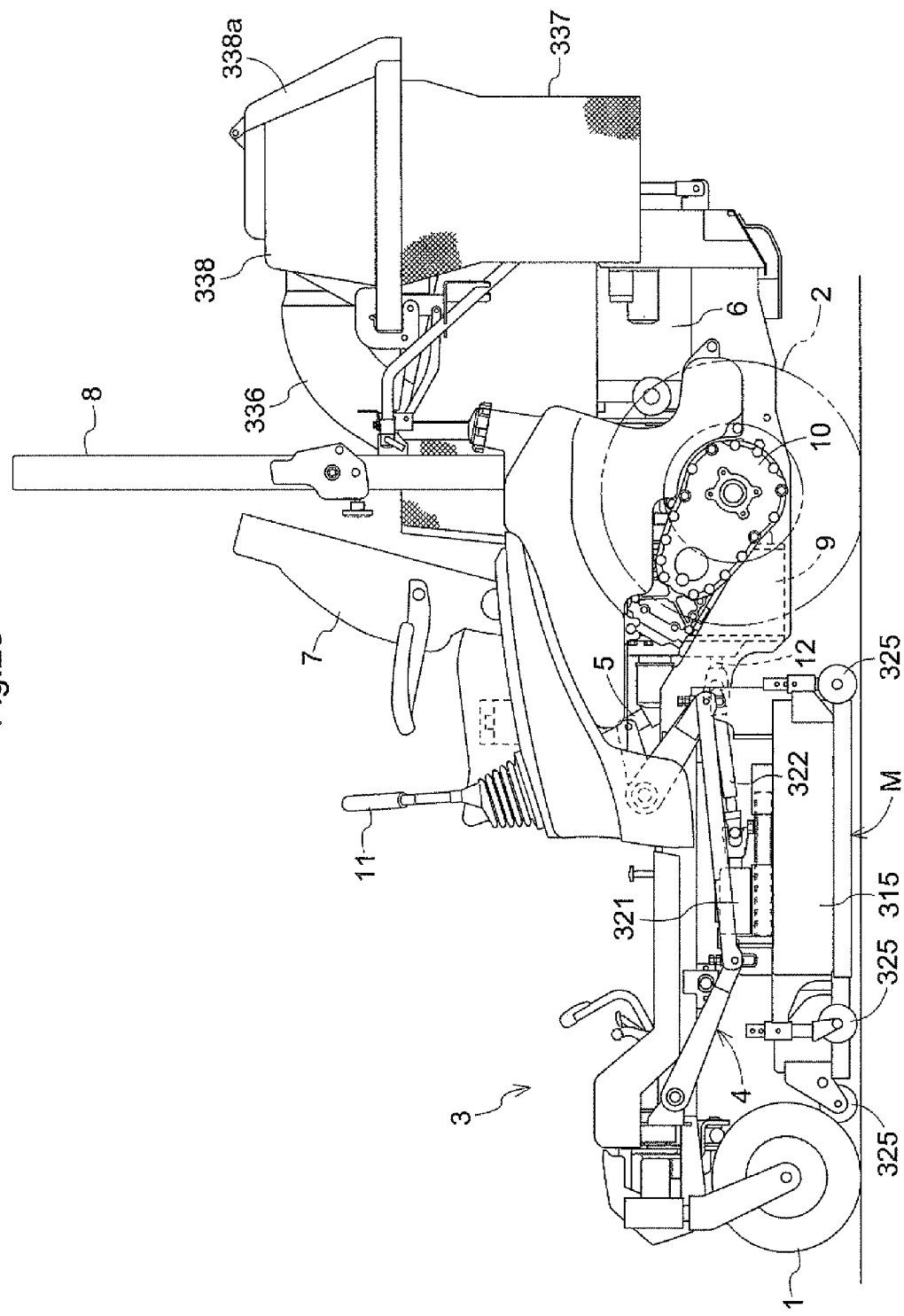
FIG. 29 is a side view of an entire riding-type lawn mower configured in a grass clippings collection mode.
Figure 30:
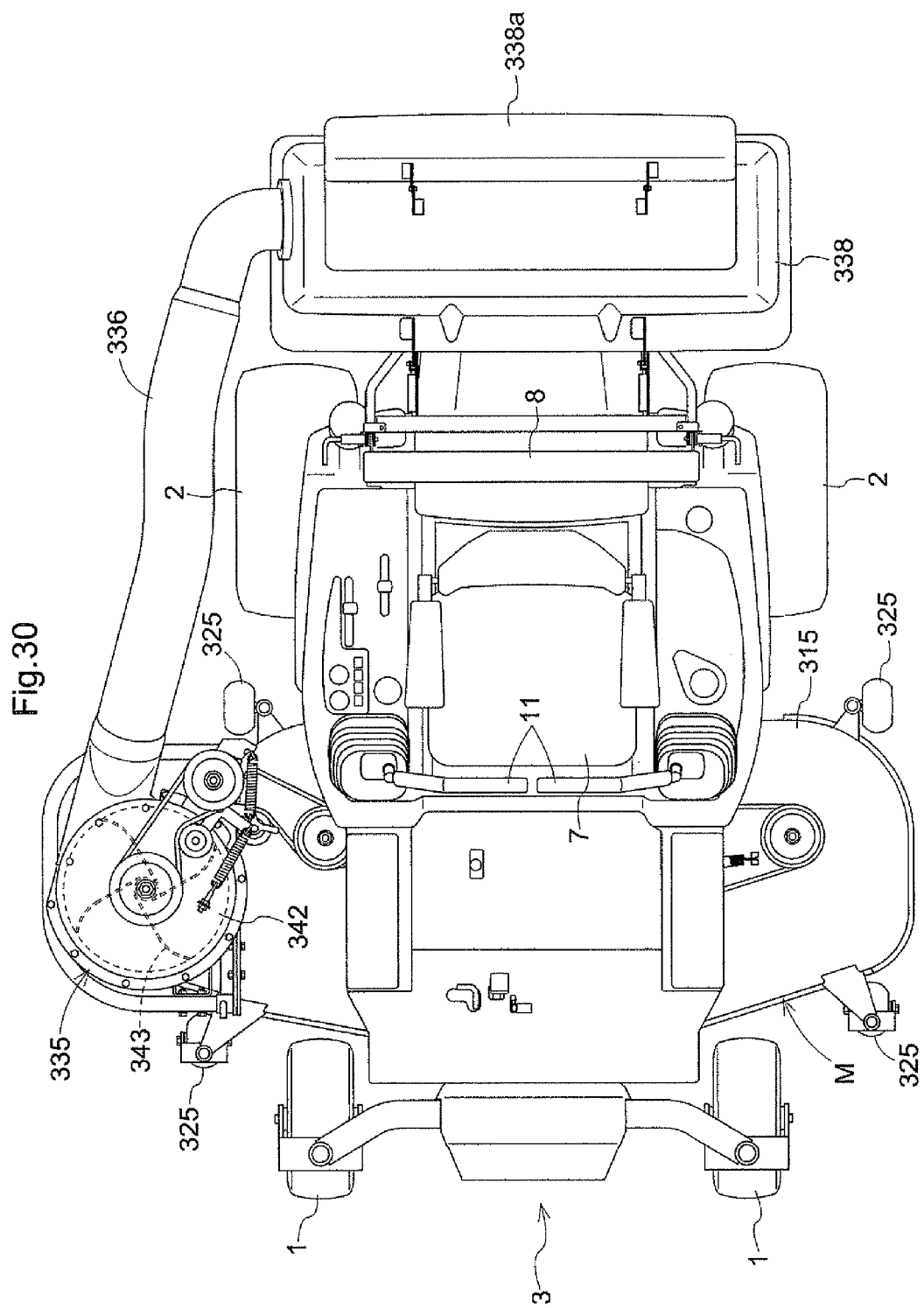
FIG. 30 is a plan view of the entire riding-type lawn mower configured in a grass clippings collection mode.
Figure 31:
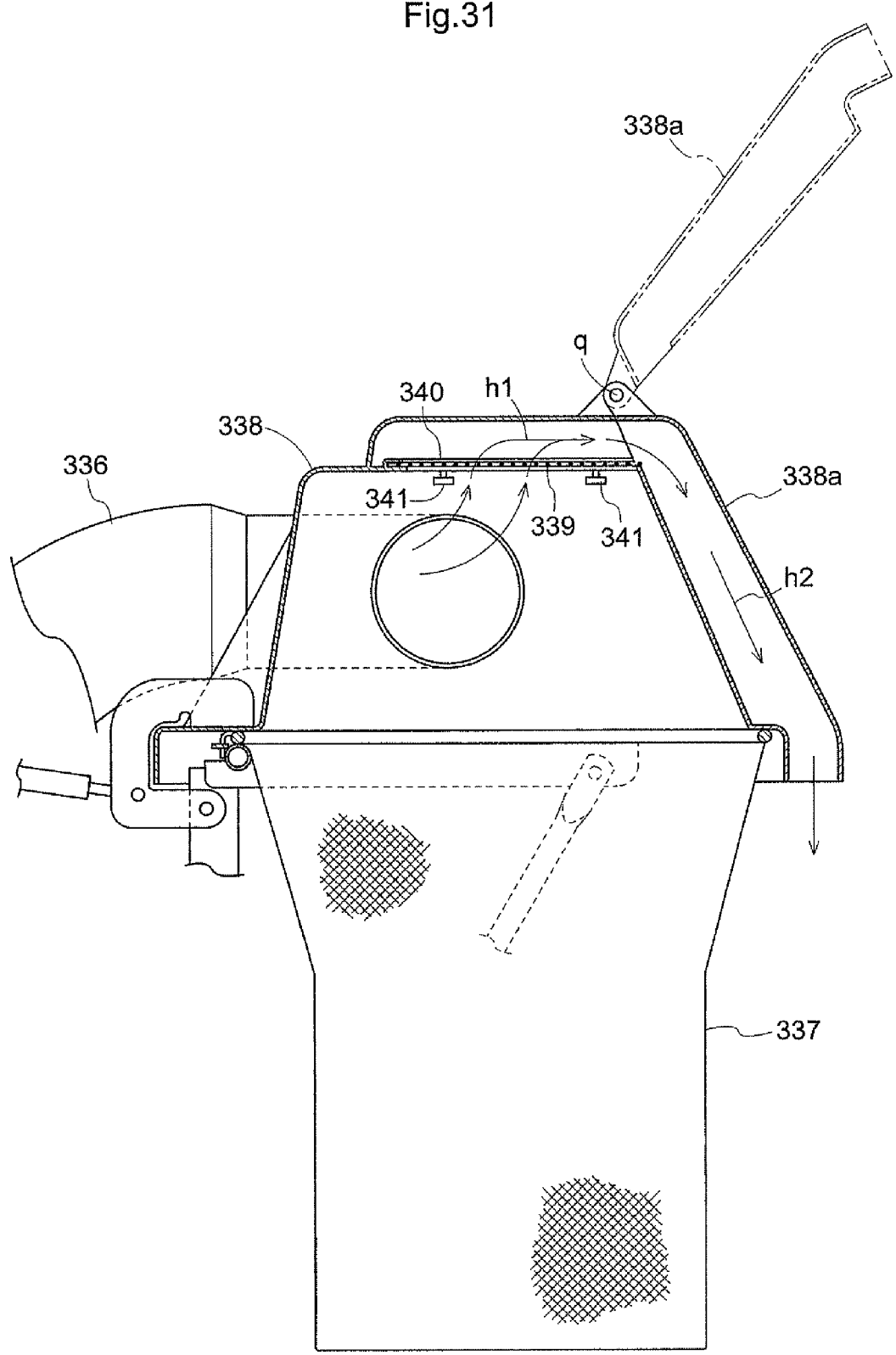
FIG. 31 is a vertical sectional side view of an upper cover and collection bag.
Figure 32:
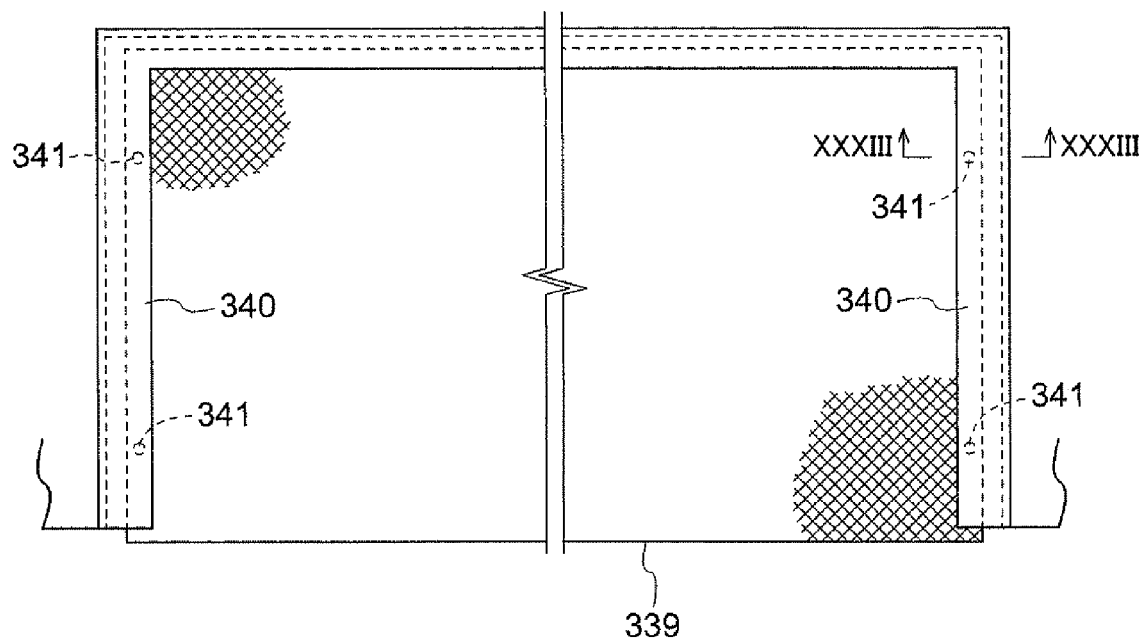
FIG. 32 is a plan view of a grass collection net of the upper cover.
Figure 33:
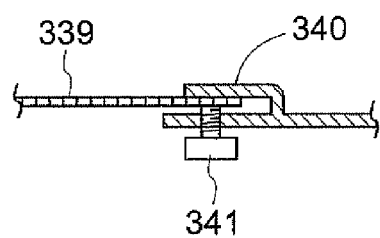
FIG. 33 is a cross-sectional view along line XXXII-XXXII of FIG. 32.

The mower M is selective between a side-discharge mode for discharging grass clippings from through a right end thereof, and a mulching mode for finely cutting the grass clippings within a cutting width thereof and depositing and leaving behind the grass clippings on the running track of the mower. In the side-discharge mode as shown in FIGS. 29 and 30, the grass clippings discharged through from the right end of the mower M is forcibly transported by a discharge blower 335 to a rear position of the vehicle body and then loaded into a collection bag 337.

Figure 23:
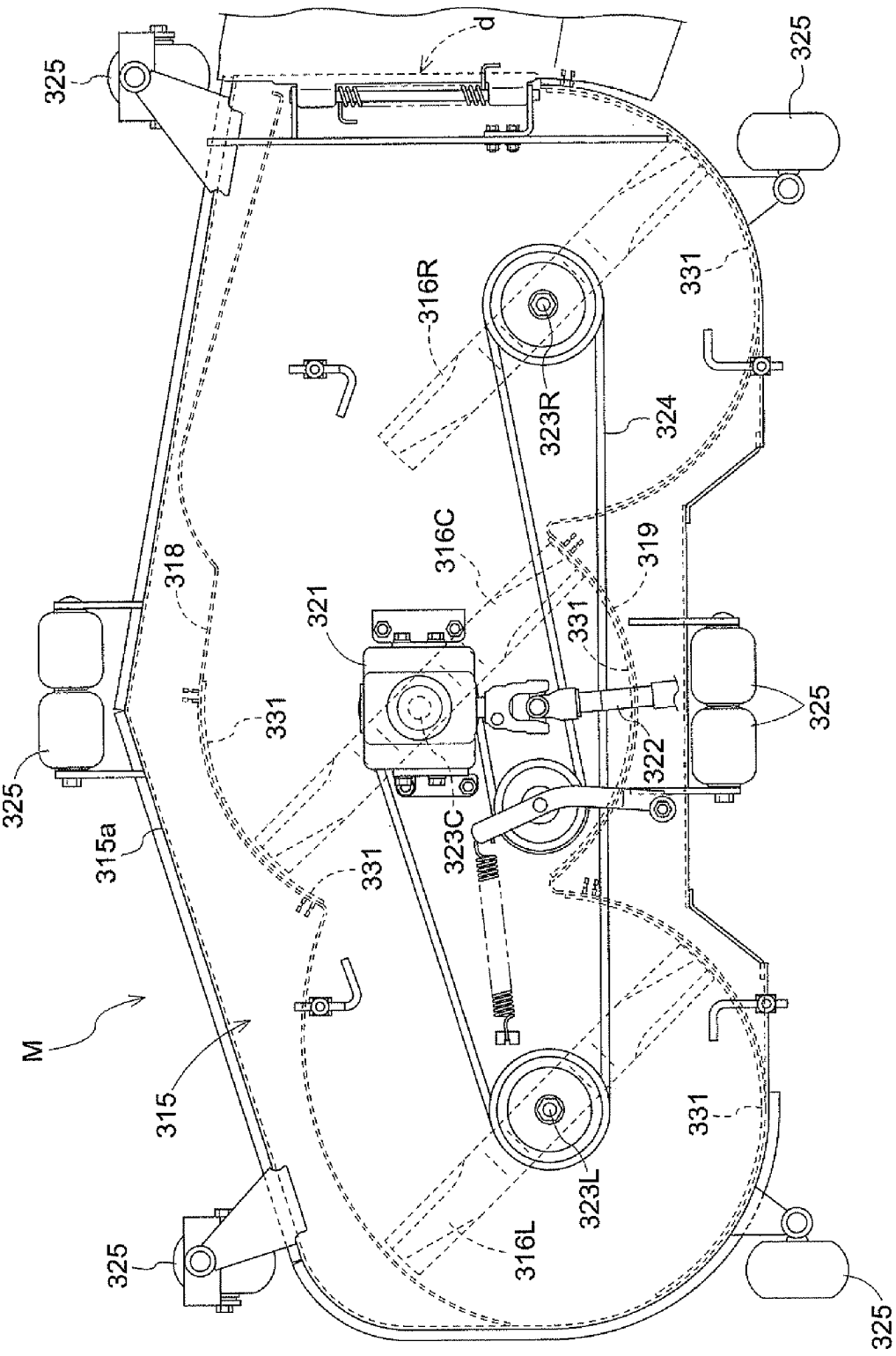
Figure 24:
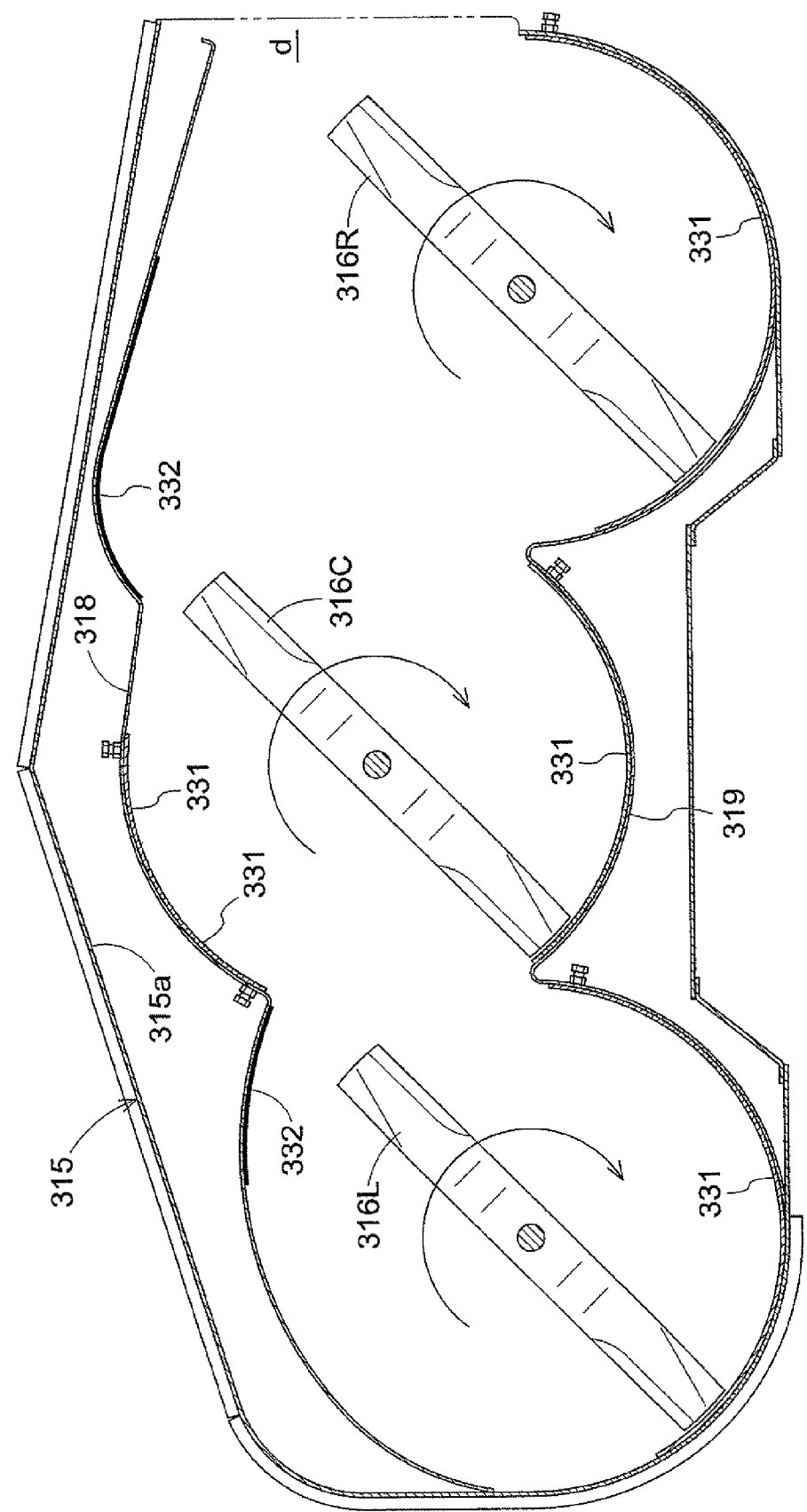

As shown in FIGS. 23 and 24, the mower M has three blades 316L, 316C, 316R rotatable about a vertical axis within a downwardly open mower deck 315. The blades 316L, 316C, 316R are shaft-supported in a triangular arrangement in plan view, with the central blade 316C displaced slightly forward. The right/left ends of rotational loci of two adjacent blades have a fore/aft elongated overlap when the vehicle body 3 (FIG. 29) moves straight forward, so that no uncut grass is left behind.

The mower deck 315 is configured as a flat deck having the same ceiling height overall. The mower deck 315 has a discharge port d formed at a right end thereof. A forward baffle plate 318, bent in the form of a wave along a front side portion of distal-end rotational locus each of the blades 316L, 316C, 316R, is suspended in the form of a vertical wall at a forward position within the mower deck 315. A rear baffle plate 319, bent in the form of a wave along a rear side portion of the distal-end rotational locus each of the blades 316L, 316C, 316R, is suspended in the form of a vertical wall at a rearward position within the mower deck 315. The mower deck 315 has a continuous cutting space elongated in the right/left direction by communicating cutting chambers of the blades 316L, 316C, 316R with one another.

With reference to FIG. 23, the power for the work system taken off of the PTO shaft 12 (FIG. 29) is transmitted to a bevel gear case 321 on a center upper surface of the mower deck 315 via a pivotable and retractable shaft-transmission mechanism 322. The torque converted to rotation about a vertical axis within the bevel gear case 321 is transmitted to a rotating shaft 323C of the central blade 316C. The rotating shaft 323C and the rotating shafts 323R, 323L of the right/left blades 316R, 316L are interlinked by a belt 324 wound around the shafts 323R, 323C, 323L. The blades 316L, 316C, 316R are rotated at a uniform speed in the same direction (clockwise in plan view) so that a forward half each of distal-end rotational loci of the blades 316L, 316C, 316R are directed toward the discharge port d. Idler wheels (anti-scalp rollers) 325 for riding over obstacles are disposed around the mower deck 315. When the mower M suspended by the link mechanism 4 (FIG. 29) with a play for upward movement approaches a slope, a ridge or the like on the ground, the mower M is relatively raised upward by any one of the anti-scalp rollers 325 riding up the ridge or the like, to prevent a direct contact of the mower deck 315 with the ground and its resulting scraping of the ground.

Figure 25:
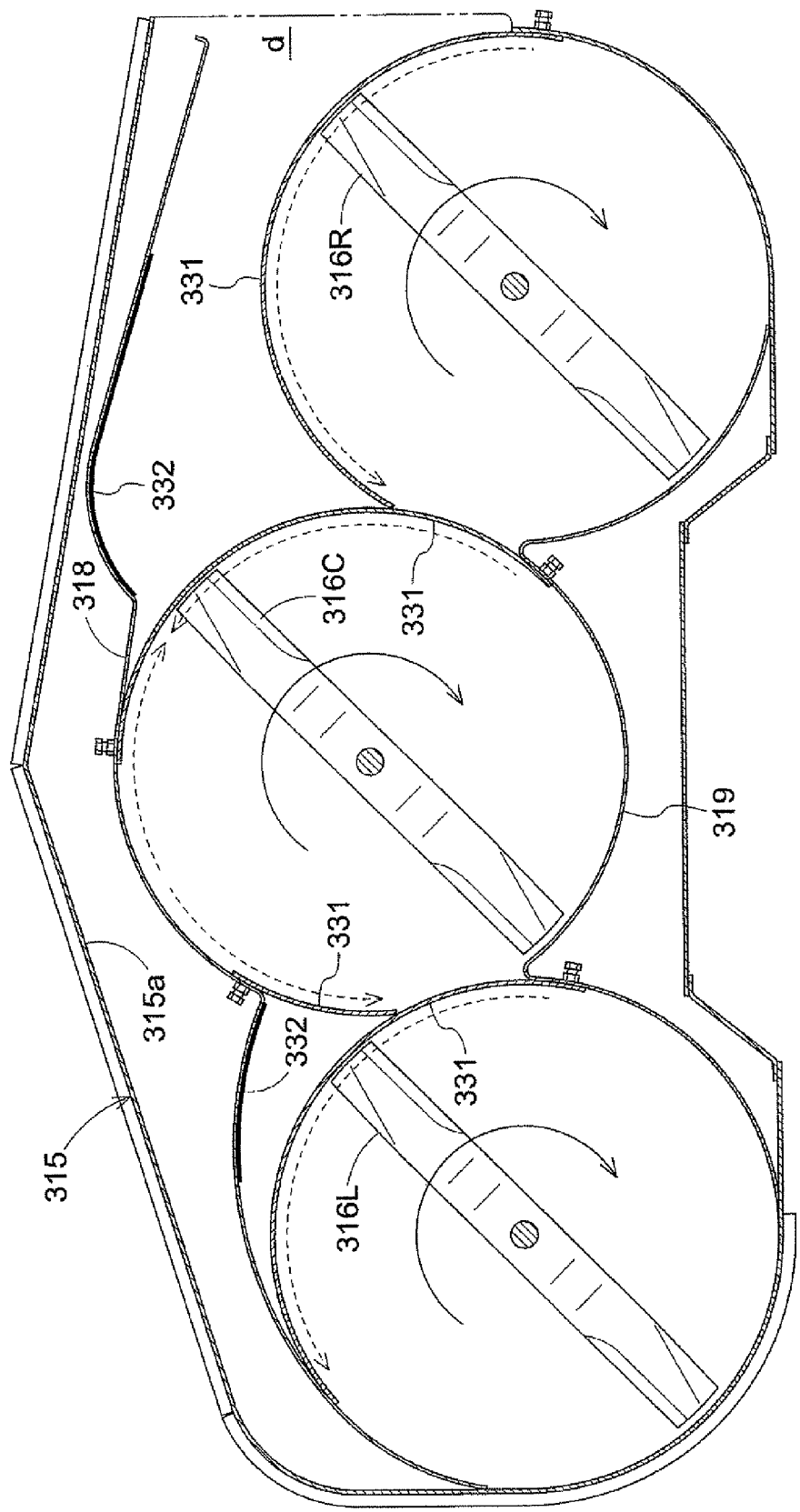
Figure 26:
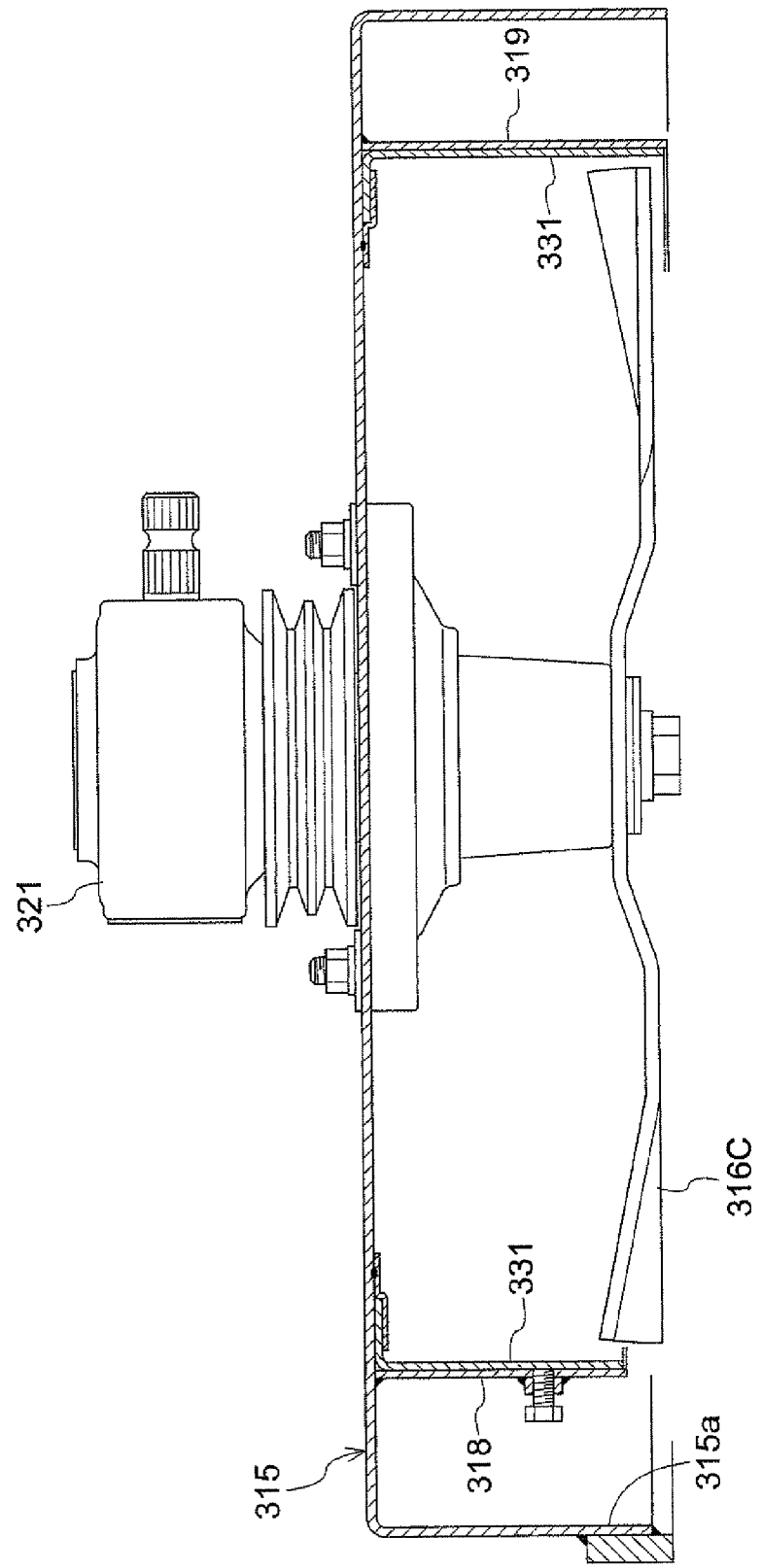

In the mower M described above, following configuration allows for change of modes of the mowing work. With reference to FIGS. 24 to 26, the forward baffle plate 318 forming a forward peripheral wall of the cutting chambers has an arcuate grass clippings guide member 331 mounted at a right/left intermediate location thereof. The guide member 331 is slidably projectable/retractable along a peripheral wall of the cutting chamber to/from a location communicating the cutting chambers of the left blade 316L and the central blade 316C. A rear baffle plate 319 forming a rear peripheral wall of the cutting chambers includes a further arcuate grass clippings guide member 331 which is slidably projectable/retractable along the peripheral wall of the cutting chamber to/from a location communicating the cutting chambers of the left blade 316L and the central blade 316C. The rear baffle plate 319 includes a still further arcuate grass clippings guide member 331 which is slidably projectable/retractable along the peripheral wall of the cutting chamber to/from a location communicating the cutting chambers of the central blade 316C and the right blade 316R. The rear baffle plate 319 includes a yet still further arcuate grass clippings guide member 331 which is slidably projectable/retractable along the peripheral wall of the cutting chamber to/from the discharge port d.

Figure 27:
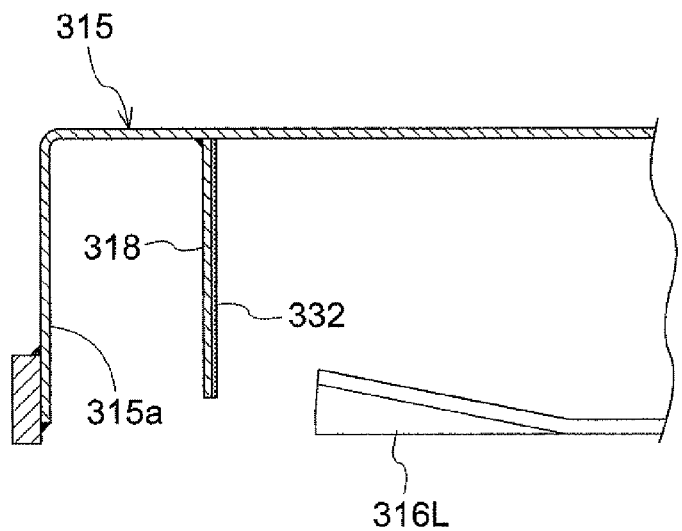

As shown in FIGS. 25 and 27, the forward baffle plate 318 has deposit prevention members 332, each in form of a sheet or plate formed of rubber material, resin or the like, applied to a forward inner peripheral wall in the cutting chamber of the left blade 316L and to a forward inner peripheral wall in the cutting chamber of the right blade 316R. The deposit prevention members 332 make it difficult for soil and grass clippings to become deposited, or facilitate peeling it away even if such is deposited.

The mower M thus constructed according to the present invention allows for change in internal modes of the mower deck 315. This allows selection between the side-discharge mode for discharging cut grass clippings from through the right end of the deck, and the mulching mode for repeatedly finely cutting the grass clippings and leaving behind the grass clippings deposited on the running track of the mower M.

Side Discharge Mode

FIG. 24 shows a side-discharge mode. In this mode, the grass clippings guide members 331 provided to the forward baffle plate 318 and the rear baffle plate 319 are slidably retracted until the locations communicating the cutting chambers for the blades 316L, 316C, 316R are maximally opened and the discharge port d at the right end of the mower deck 315 is set in an open state (each corresponding to a side discharge position of the grass clippings guide member). The grass clippings cut by the rotary blades 316L, 316C and 316R is thereby dispersed and transported in the rightward direction in FIG. 24 along the forward baffle plate 318 forming the forward peripheral wall of the cutting chambers, and discharged from through the discharge port d at the right end of the mower deck 315.

Mulching Mode

FIG. 25 shows a mulching mode. In this mode, the grass clippings guide members 331 provided to the forward baffle plate 318 and the rear baffle plate 319 are slidably advanced until the communicating locations of the cutting chambers for the blades 316L, 316C, 316R are blocked and the discharge port d at the right end of the mower deck 315 is set to a closed state (each corresponding to a mulching position of the grass clippings guide member). Then, the grass clippings is carried around and finely cut in the independent cutting chambers of the blades 316L, 316C, 316R, and left behind and deposited on the running track of the mower M.

In the mulching mode, not only is it possible to fully open/close the communication locations in the cutting chambers, but it is also possible, depending on the condition of the grass, to modify the sliding distance of the grass clippings guide members 331 other than one blocking the discharge port d, and to mow the grass after adjusting the degree of opening of the communication locations between adjacent cutting chambers.

[Other Modes of the Fourth Embodiment]

The fourth embodiment of the present invention can also be implemented in modes such as those described below.

Figure 28:
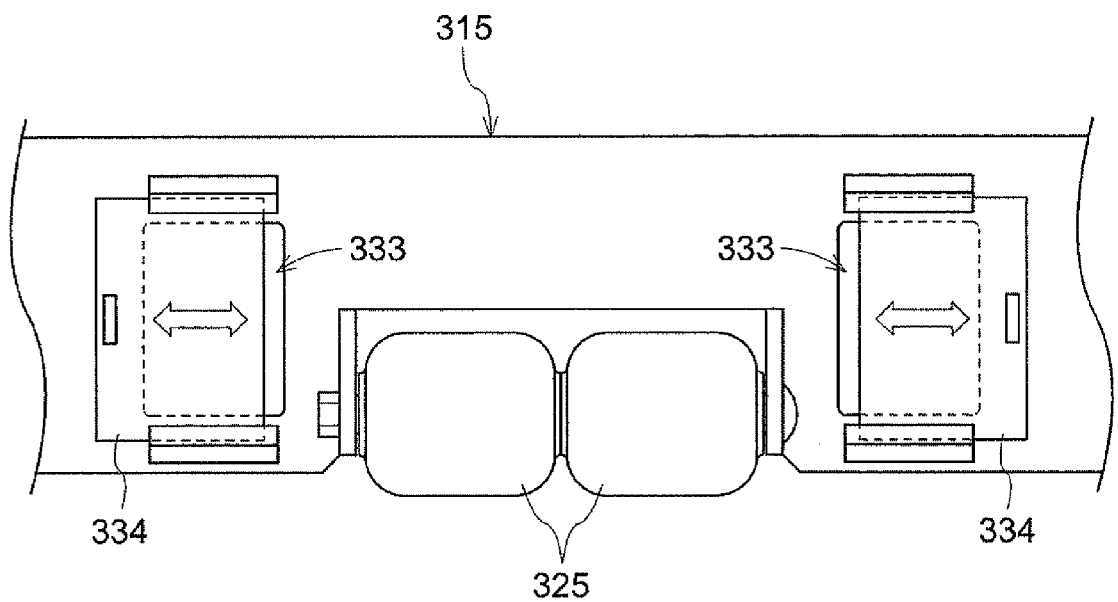
FIG. 28 is a rear view showing a center area of the mower deck.

(1) As shown in FIG. 28, apertures 333 for introducing ambient air is formed in a rear wall of the mower deck 315. Each aperture 333 can be adjustably opened/closed by a slide shutter 334.

This assists erection of grass by enlarging an opening of the aperture 333 and increasing an intake of ambient air when the grass stands highly densely, for example. This allows for mowing at a uniform cutting height.

High-density grass waves vigorously and the cutting height readily becomes not uniform, when the intake of ambient air from the aperture 333 is considerable. In this case, the opening of the aperture 333 is reduced or the aperture 333 is closed.

(2) FIGS. 29 to 33 show another configuration for collecting grass clippings after being cut in the side discharge mode. In this configuration, the grass clippings discharged from the discharge port d at the right end of the mower deck 315 is fed to a discharge blower 335. The grass clippings discharged from the discharge blower 335 is transported rearward by the wind via a duct 336, and loaded into a collection bag 337.

The collection bag 337 has at an upper position thereof an upper cover 338 connected to a rear end of the duct 336. The upper cover 338 has at a top thereof a grass collection net 339 for escaping the transport wind. After the transport wind blown into the upper cover 338 goes upward through the grass collection net 339, it goes through an upper wind discharge route h1 formed at an upper area inside and a rear wind pathway h2 formed inside a rear wall 338a of the upper cover 338, and is then discharged downward. The rear wall 338a of the upper cover 338 is supported to be vertically pivotable about an upper pivot q. The grass collection net 339 is mounted on and inserted into right/left guide rails 340 to be slidable in the fore/aft direction, and fastened and secured to the same by a knobbed bolt 341. The grass collection net 339 can be removed rearward by swinging upward and opening the upper cover 338 and loosening the knobbed bolt 341.

Figure 34:
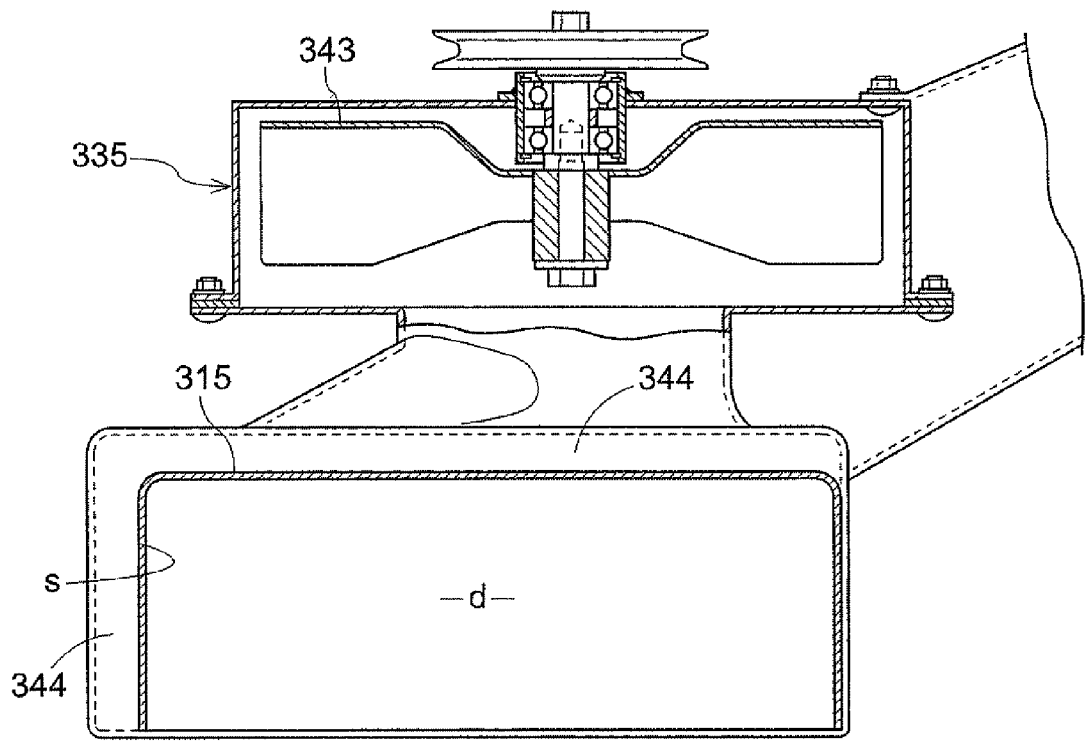
FIG. 34 is a vertical sectional side view of a discharge blower and a discharge port of a small mower deck.
Figure 35:
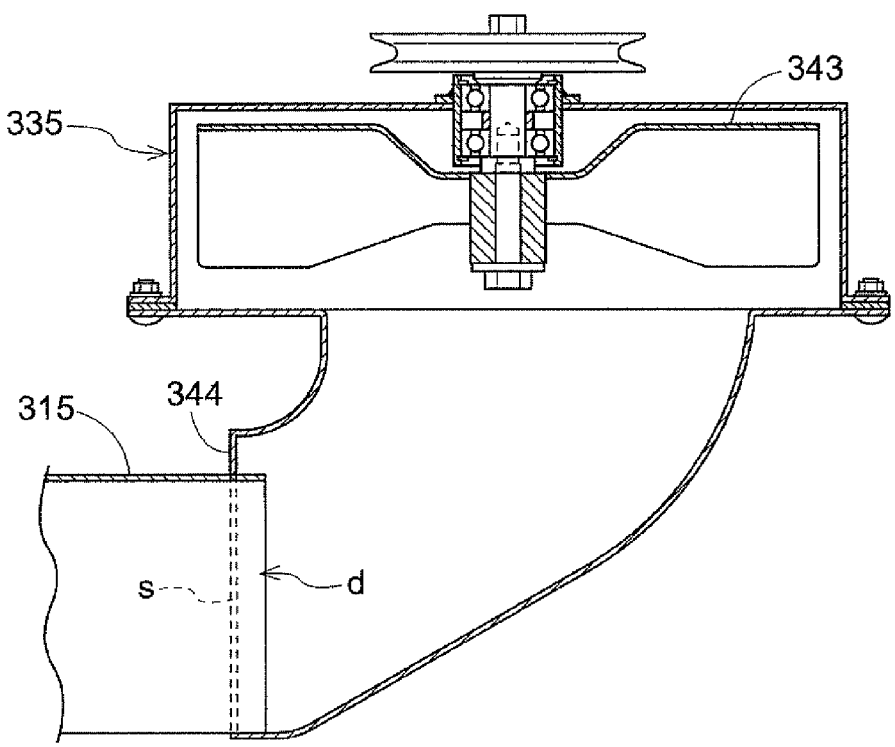
FIG. 35 is a vertical sectional rear view of the discharge blower and the discharge port of the small mower deck.
Figure 36:
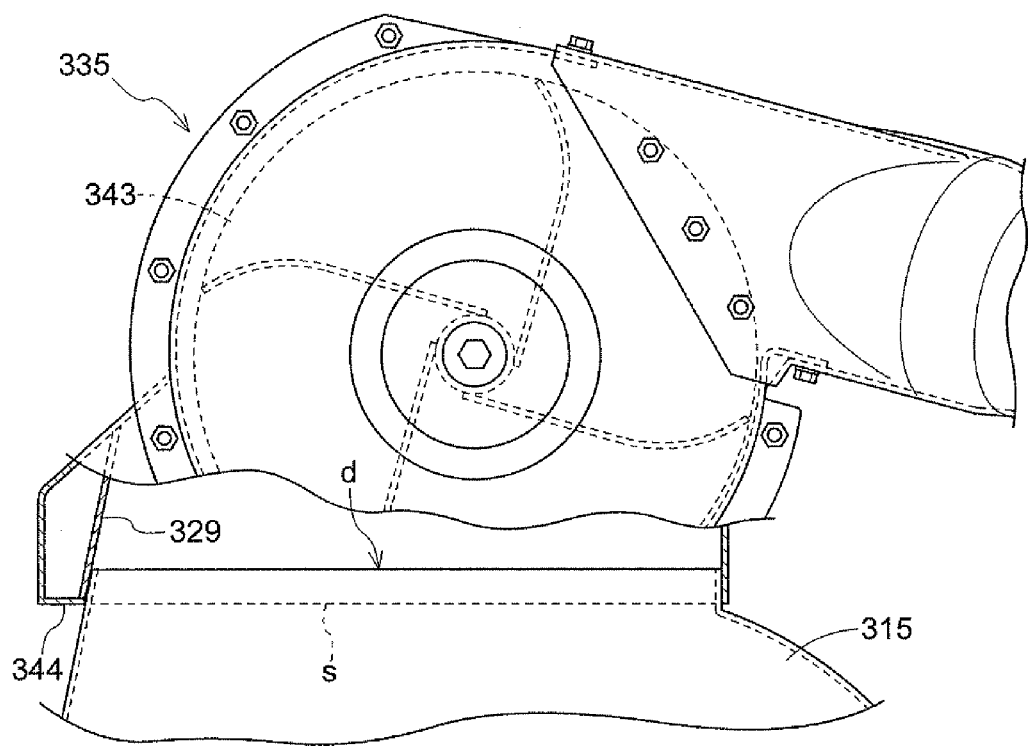
FIG. 36 is a partial cutaway plan view of the discharge blower and the discharge port of a small mower deck.
Figure 37:
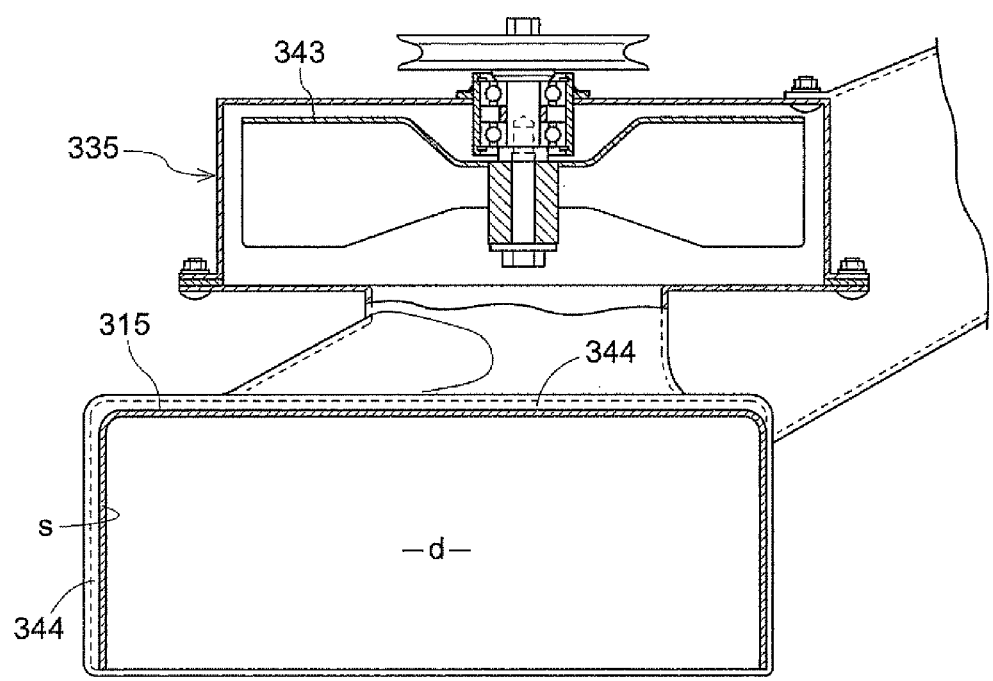
FIG. 37 is a vertical sectional side view of the discharge blower and the discharge port of a large mower deck.

As shown in FIGS. 34 to 37, the discharge blower 335 for blowing and transporting grass clippings into the collection bag 337 has vertical rotating vanes 343 thereof housed in a resin-molded casing 342, which vanes 343 are belt-interlocked to the right blade 316R and driven together with the same. The casing 342 has at a left end thereof a connection port s in communication with the discharge port d at the right end of the mower deck 315. The connection part s includes a flange 344. With reference to FIGS. 34 and 36, if a small mower deck 315 has a small discharge port d, the flange part 344 remains as it is when interconnecting the ports d, s. In this case, a guide plate 329 such as that shown in FIG. 36 is mounted so that the grass clippings is not retained within the space inside the flange 344. On the other hand, if a large mower deck 315 has a large discharge port d, the ports d, s are interconnected after cutting out a portion of the flange 344 in accordance with the size of the discharge port d, as shown in FIG. 37.

What we claim is:

1. A mower comprising:
    a mower deck;
    a plurality of cutting chambers mutually communicated and arranged in a lateral direction within the mower deck, each of the cutting chambers is bounded by a peripheral wall thereof;
    a blade mounted in each of the cutting chambers to be rotatable about a vertical axis;
    a grass clippings guide in form of a vertical wall disposed in an upper area within the cutting chamber, to guide the grass clippings flowing within the cutting chamber toward a center of rotation of the blade, the grass clippings guide forming, in plan view, a wedge-shaped space extending from the peripheral wall toward the center of rotation of the blade, the wedge-shaped space having a forward end and a rear end defined with respect to a blade-rotating direction, a bottom side defined in opposition to the blade, and a width defined with respect to the blade-radial direction, the width being increased as the wedge-shaped space extends from the forward end toward the rear end; and
    a shield member disposed between the grass clippings guide and the peripheral wall of the cutting chamber and disposed in the wedge-shaped space, the shield member having a rear wall and a bottom plate, the rear wall closing the rear end of the wedge-shaped space and the bottom plate closing the bottom side of the wedge-shaped space to prevent grass clippings from entering the wedge-shaped space.

2. The mower according to claim 1, wherein the shield member has a connecting wall extending along an outer side of the grass clippings guide, the shield member being mounted on and supported by the grass clippings guide.

3. The mower according to claim 2, wherein the shield member is mounted on and supported by the grass clippings guide so that a height of the shield member is adjustable.

4. A mower comprising:
    a mower deck;
    a plurality of cutting chambers mutually communicated and arranged in a lateral direction within the mower deck; and
    a blade mounted in each cutting chamber to be rotatable about a vertical axis, wherein
    a grass clippings guide in form of a vertical wall is disposed in an upper area within the cutting chamber, to guide the grass clippings flowing within the cutting chamber toward a center of rotation of the blade;
    a shield member is disposed for preventing entry of grass clippings between the grass clippings guide and a peripheral wall of the cutting chamber;
    the grass clippings guide is disposed in the upper area within the cutting chamber such that a wedge-shaped space, in plan view, is present between the grass clippings guide and the peripheral wall of the cutting chamber, and the shield member prevents grass clippings from entering the wedge-shaped space; and
    the grass clippings guide has a concave formed at a lower side thereof to check an excessive flow of grass clippings toward the center of rotation of the blade.

5. The mower according to claim 4, wherein the concave is formed such that it is recessed to a smaller extent as the grass clippings guide extends farther away from the peripheral wall of the cutting chamber.

* * * * *